(12) United States Patent
Stiffler et al.

(10) Patent No.: US 9,853,733 B2
(45) Date of Patent: *Dec. 26, 2017

(54) TECHNIQUES FOR SINGLE SIDEBAND SUPPRESSED CARRIER (SSBSC) OPTICAL SIGNALS

(71) Applicants: Montana State University, Bozeman, MT (US); S2 Corporation, Bozeman, MT (US)

(72) Inventors: Colton Richard Stiffler, Bozeman, MT (US); Scott Henry Bekker, Bozeman, MT (US); Kristian D. Merkel, Bozeman, MT (US); Randy R. Reibel, Bozeman, MT (US); William Randall Babbitt, Bozeman, MT (US); Krishna Mohan Rupavatharam, Bozeman, MT (US)

(73) Assignees: Montana State University, Bozeman, MT (US); S2 Corporation, Bozeman, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/670,598

(22) Filed: Mar. 27, 2015

(65) Prior Publication Data

US 2015/0200727 A1    Jul. 16, 2015

Related U.S. Application Data

(63) Continuation of application No. 13/169,482, filed on Jun. 27, 2011, now Pat. No. 9,020,360.

(Continued)

(51) Int. Cl.
*H04B 10/2575* (2013.01)
*H04B 10/516* (2013.01)

(52) U.S. Cl.
CPC ... *H04B 10/25759* (2013.01); *H04B 10/5165* (2013.01)

(58) Field of Classification Search
CPC .................................................. H04B 10/5165
See application file for complete search history.

(56) References Cited

U.S. PATENT DOCUMENTS 5,301,058 A    4/1994  Olshansky
6,262,834 B1   7/2001  Nichols et al.
(Continued)

OTHER PUBLICATIONS

Anderson et al., Gallium arsenide metal-semiconductor-metal photodiodes as optoelectronic mixers for microwave single-sideband modulation, Applied Optics, Jan. 1, 1998, pp. 28-33, vol. 37, No. 1, Publisher: Optical Society of America, Published in: Washington, DC/US.

(Continued)

*Primary Examiner* — Shi K Li
*Assistant Examiner* — Mina Shalaby
(74) *Attorney, Agent, or Firm* — Klarquist Sparkman, LLP

(57) ABSTRACT

A method and apparatus includes an optical source for a single order single-sideband suppressed-carrier optical signal with a bandwidth that scales from over 4 gigaHertz or is at least 8 GHz from an optical carrier frequency. In an example embodiment, an apparatus includes a stable laser source configured to output an optical carrier signal at a carrier frequency. The apparatus includes a radio frequency electrical source configured to output an electrical radio frequency signal with a radio frequency bandwidth less than one octave. The apparatus also includes an optical modulator configured to output an optical signal with the optical carrier signal modulated by the radio frequency signal in a plurality of orders (harmonics) of optical frequency sidebands. The apparatus further includes an optical filter configured to pass (Continued)

one single order optical frequency sideband of the optical signal, which sideband does not overlap the sideband of any other harmonic.

19 Claims, 22 Drawing Sheets

Related U.S. Application Data

(60) Provisional application No. 61/360,714, filed on Jul. 1, 2010.

(56) References Cited

U.S. PATENT DOCUMENTS

| | | | |
|---|---|---|---|
| 7,265,712 B2* | 9/2007 | Merkel et al. | 342/195 |
| 2005/0211875 A1* | 9/2005 | Kawanishi et al. | 250/208.1 |
| 2007/0041735 A1* | 2/2007 | Darcie et al. | 398/186 |
| 2009/0214223 A1* | 8/2009 | Chen et al. | 398/183 |
| 2009/0279825 A1 | 11/2009 | Kawanishi et al. | |
| 2009/0297155 A1* | 12/2009 | Weiner | H04B 10/00 398/115 |
| 2009/0324251 A1* | 12/2009 | Ilchenko | G02F 1/011 398/183 |
| 2010/0008680 A1* | 1/2010 | Chen et al. | 398/198 |
| 2010/0014872 A1* | 1/2010 | Fu et al. | 398/158 |
| 2010/0142963 A1* | 6/2010 | Monroy et al. | 398/115 |
| 2011/0110387 A1* | 5/2011 | Maleki et al. | 372/20 |
| 2011/0299849 A1* | 12/2011 | Klotz et al. | 398/26 |
| 2012/0141141 A1* | 6/2012 | Bulot et al. | 398/182 |

OTHER PUBLICATIONS

Anderson et al., −70 dB optical carrier suppression by two-beam coupling in photorefractive media, Applied Physics B, Apr. 27, 2001, pp. 743-748, vol. 72, Publisher: Springer-Verlag, Published in: New York, NY/US.

Cole et al., Optical frequency chirp generation by swept sideband injection locking, Journal of Luminescence, Jan. 1, 2004, pp. 146-149, vol. 107, Publisher: Elsevier, Published in: Amsterdam/NL.

Darmawan et al., Nested ring Mach-Zehnder interferometer, Optics Express, Jan. 22, 2007, pp. 437-448, vol. 15, No. 2, Publisher: Optical Society of America, Published in: Washington, DC/US.

Davies et al., Hybrid Modulator Structures for Subcarrier and Harmonic Subcarrier Optical Single Sideband, Photonics Technology Letters, Apr. 1, 1998, pp. 600-602, vol. 10, No. 4, Publisher: IEEE, Published in: New York, NY/US.

Frankel et al., Optical Single-Sideband Suppressed-Carrier Modulator for Wide-Band Signal Processing, Journal of Lightwave Technology, May 1, 1998, pp. 859-863, vol. 16, No. 5, Publisher: IEEE, Published in: New York, NY/US.

Higuma et al., X-cut lithium niobate optical single-sideband modulator, Electronics Letters, Apr. 12, 2001, pp. 515-516, vol. 37, No. 8, Publisher: IEE, Published in: Stevenage/GB.

Higuma et al., A bias condition monitor technique for the nested Mach-Zehnder modulator, Electronics Express, Jun. 10, 2006, pp. 238-242, vol. 3, No. 11, Publisher: IEICE, Published in: Tokyo/JP.

Izutsu et al., Integrated Optical SSB Modulator/Frequency Shifter, Journal of Quantum Electronics, Nov. 1, 1981, pp. 2225-2227, vol. QE-17, No. 11, Publisher: IEEE, Published in: New York, NY/US.

Kawanishi et al., Linear Single-Sideband Modulation for High-SNR Wavelength Conversion, Photonics Technology Letters, Jun. 1, 2004, pp. 1534-1536, vol. 16, No. 6, Publisher: IEEE, Published in: New York, NY/US.

Li et al., Single-side-band optical modulation in SCM systems for high-speed optical transmission, Optoelectronics Letters, Jan. 1, 2009, pp. 0048-0050, vol. 5, No. 1, Publisher: Springer, Published in: Tianjin/CN.

Loayssa et al., Single-Sideband Suppressed-Carrier Modulation Using a Single-Electrode Electrooptic Modulator, Photonics Technology Letters, Aug. 1, 2001, pp. 869-871, vol. 13, No. 8, Publisher: IEEE, Published in: New York, NY/US.

Loayssa et al., Optical Single-Sideband Modulators and Their Applications, Fiber and Integrated Optics, Mar. 1, 2004, pp. 171-188, vol. 23, Publisher: Taylor & Francis Inc., Published in: Abingdon, Oxfordshire/UK.

Shimotsu et al., LiNbO3 optical single-sideband modulator, Optical Fiber Communication Conference, 2000, Mar. 7, 2000, pp. 214-217, vol. 4, Publisher: IEEE, Published in: Baltimore, MD/US.

Shimotsu et al., Wideband frequency conversion with LiNbO3 optical single-sideband modulator, Optical Fiber Communication Conference 2001, Mar. 17, 2001, pp. WK3_1-WK3_4, vol. 3, Publisher: IEEE, Published in: Baltimore, MD/US.

Sieben, Single Sideband Modulation for Digital Fiber Optic Communication Systems, Sep. 1, 1998, Publisher: University of Alberta, Published in: Edmonton, Alberta/CA, 206 pp.

Sieben et al., Optical Single Sideband Transmission at 10 Gb/s Using Only Electrical Dispersion Compensation, Journal of Lightwave Technology, Oct. 1, 1999, pp. 1742-1749, vol. 17, No. 10, Publisher: IEEE, Published in: New York, NY/US.

Xiao, Shijun, and Andrew M. Weiner, Coherent Photonic Processing of Microwave Signals Using Spatial Light Modulators: Programmable Amplitude Filters, Journal of Lightwave Technology, 2006, p. 2523 vol. 24, No. 7, Publisher: OSA Publishing, Published in: https://www.osapublishing.org/jlt/viewmedia.cfm?uri=jlt-24-7-2523&seq=0.

* cited by examiner

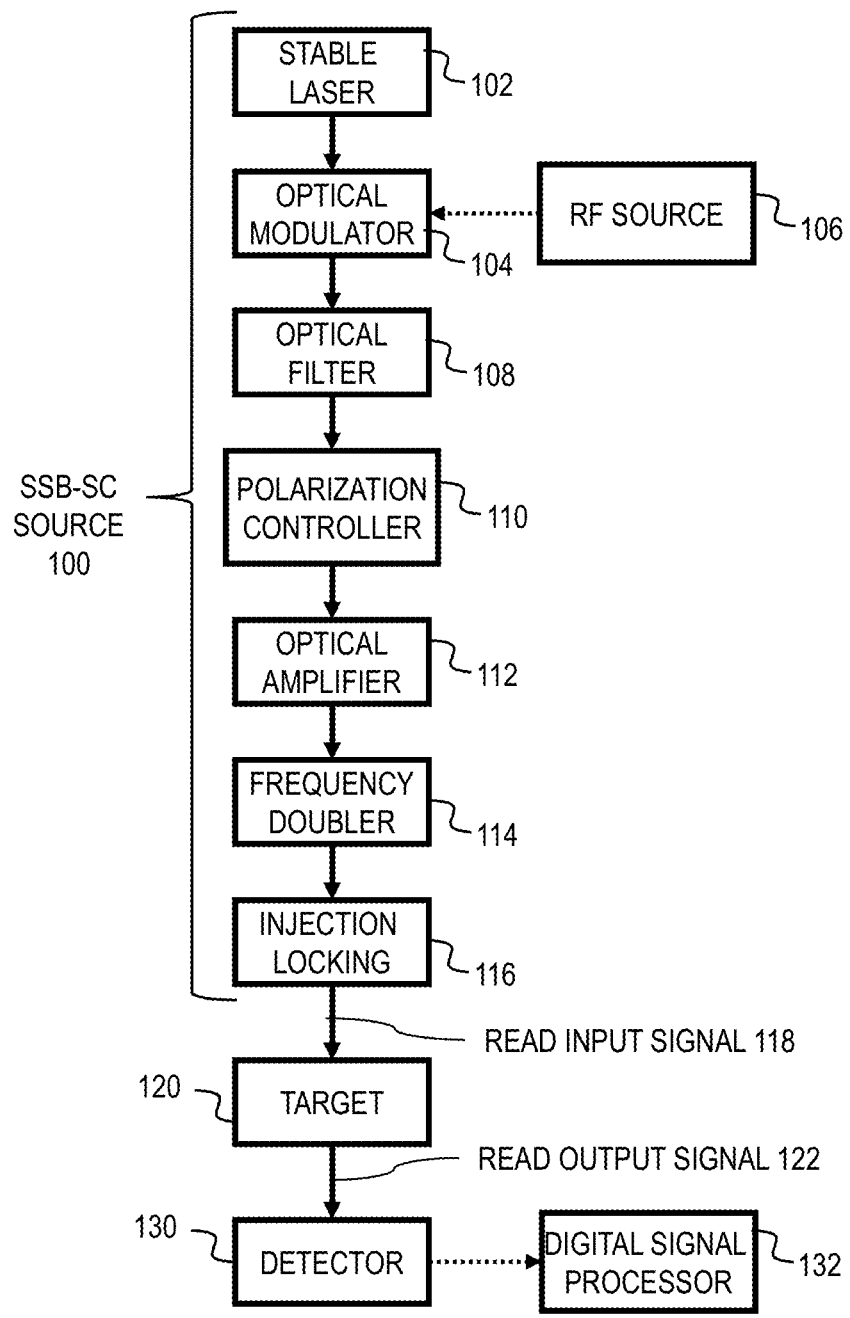

FIG. 7A
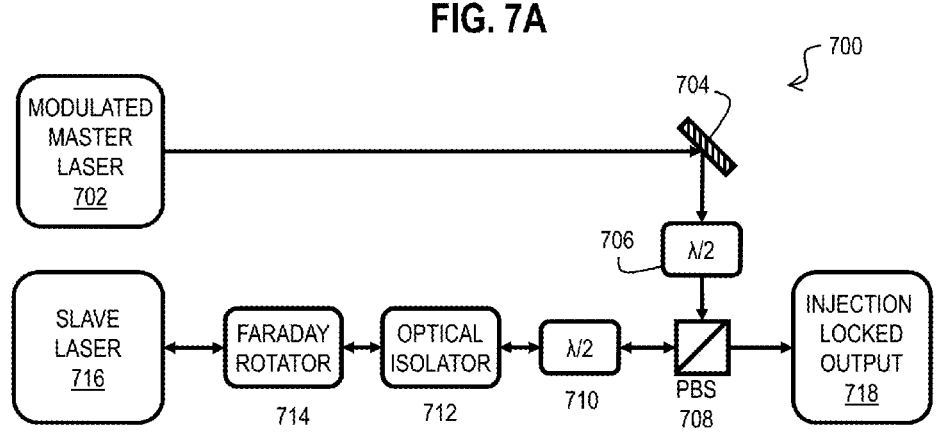
FIG. 7B        FIG. 7C
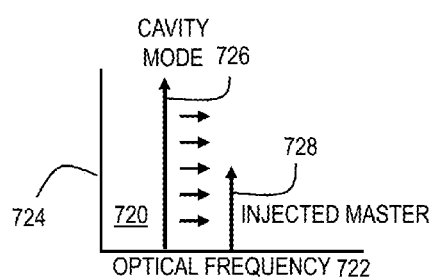   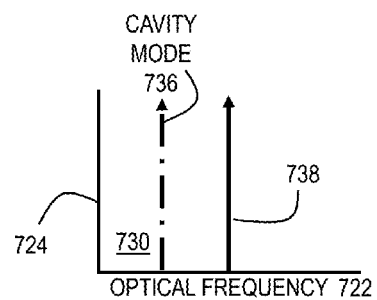

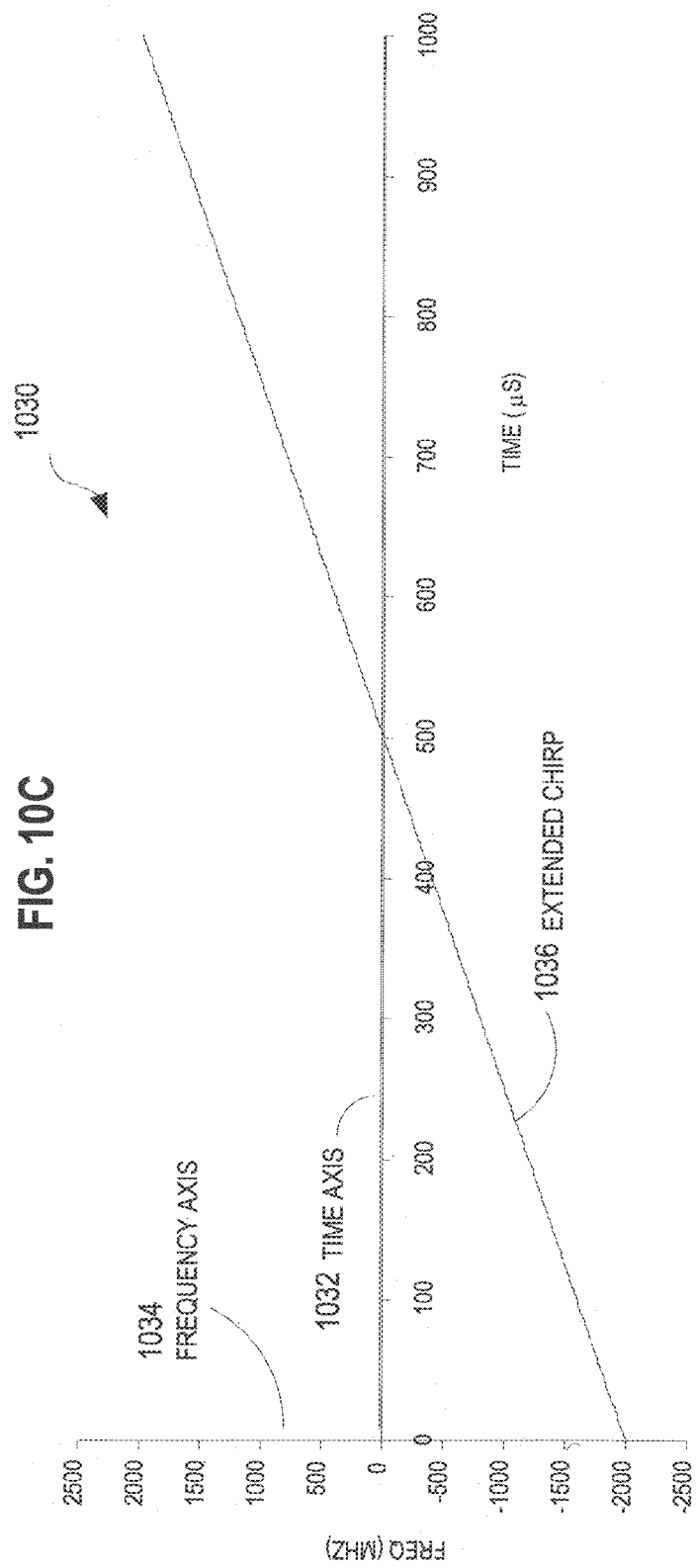

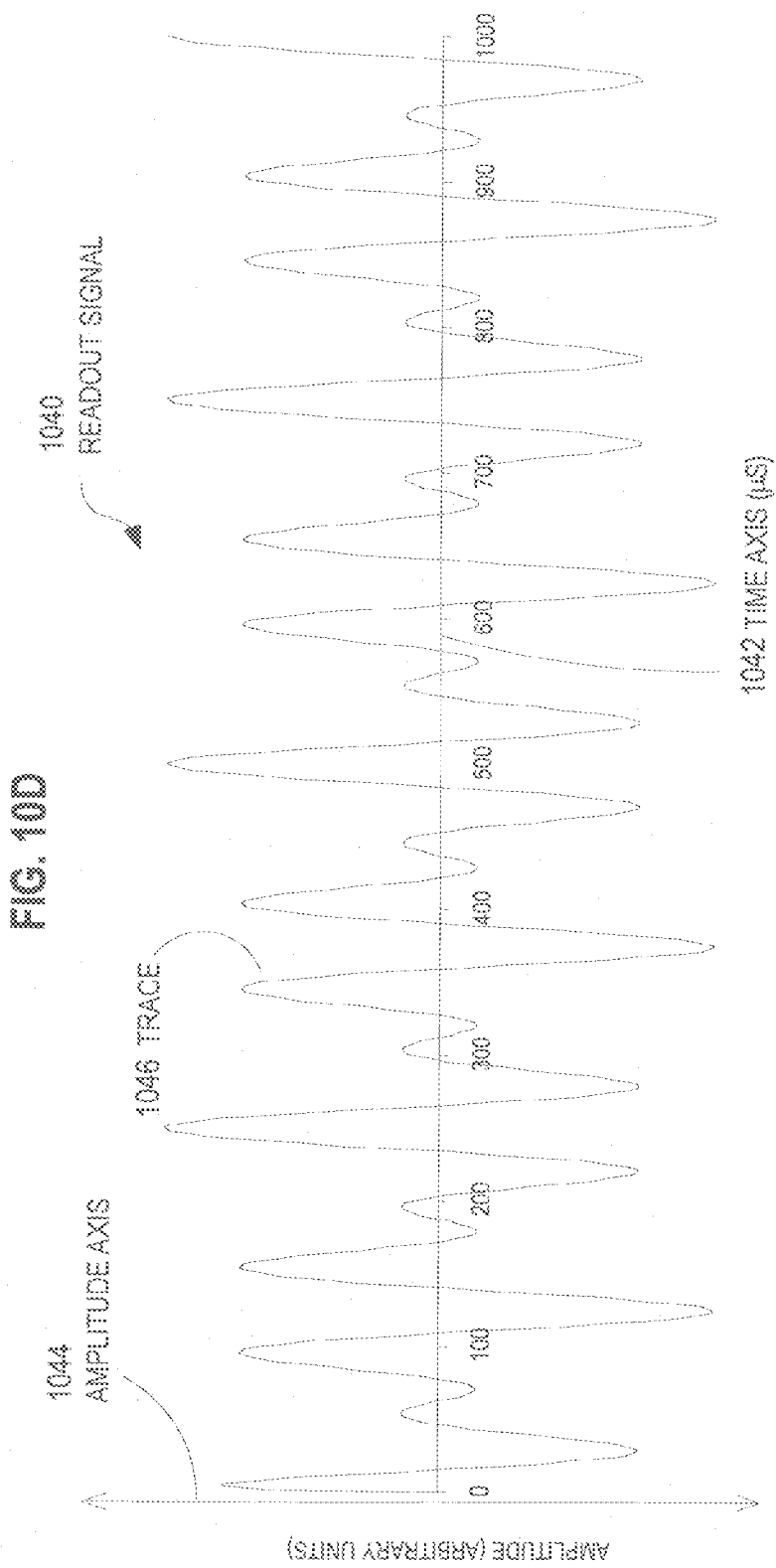

TECHNIQUES FOR SINGLE SIDEBAND SUPPRESSED CARRIER (SSBSC) OPTICAL SIGNALS

CROSS-REFERENCE TO RELATED APPLICATIONS

This application claims benefit as a Continuation of application Ser. No. 13/169,482, filed Jun. 27, 2011 the entire contents of which are hereby incorporated by reference as if fully set forth herein, under 35 U.S.C. §120, which application claims benefit of Provisional Appln. 61/360,714, filed Jul. 1, 2010, the entire contents of which are hereby incorporated by reference as if fully set forth herein, under 35 U.S.C. §119(e).

STATEMENT OF GOVERNMENTAL INTEREST

This invention was made with Government support under Contract No. N66001-09-C-1010 awarded by the Space and Naval Warfare Systems Center (SPAWAR) Small Business Innovative Research (SBIR) Program of the Department of the Navy, and under Contract No. N00014-07-1-1224 awarded by the Office of Naval Research (ONR) of the Department of the Navy. The Government has certain rights in the invention.

BACKGROUND

Optical linear frequency modulation (LFM) signals have many uses in optical devices and processors. For example, optical LFM signals can be used to generate optical signals, to interact with optical signals, and to probe the optical spectral contents of devices or materials.

In a recent approach described in U.S. Pat. No. 7,265,712, by Kristian Doyle Merkel, Zachary Cole, Krishna Mohan Rupavatharam, William Randall Babbitt, Kelvin H. Wagner and Tiejun Chang, entitled "Techniques for Processing High Time-Bandwidth Signals Using a Material with Inhomogeneously Broadened Absorption," issued Sep. 4, 2007 (hereinafter Merkel), a temporally extended optical LFM signal is used as a probe waveform to generate a readout signal that represents a temporal map of the structure of the spectral population grating (also referred to as spatial-spectral grating or S2 grating) in an inhomogeneously broadened transition (IBT) material, rather than its Fourier transform. This temporal map signal can be measured with inexpensive, high-dynamic-range, megaHertz (MHz, 1 MHz=$10^6$ Hertz, 1 Hertz equals one cycle per second) bandwidth detectors and digitizers. Such chirps generally have a duration greater than the decoherence time and less than the population decay time of the inhomogeneously broadened absorption spectrum in IBT material. As described in Merkel, an optical LFM signal sweeping over some wideband portion of the IBT frequency absorption profile of interest, e.g., typically in excess of 1 gigaHertz (GHz, 1 GHz=$10^9$ Hertz) can produce a low-bandwidth readout signal that can be detected and digitized with the low-bandwidth high-dynamic-range devices currently available. This low-bandwidth readout signal represents a temporal map of the spectral features in the spatial-spectral grating. For example, in some cases the readout signal includes a temporal spike that represents a single frequency hole burned in the IBT material, and in other cases the readout signal includes a superposition of low-bandwidth beat frequencies, each beat related to a periodic component in the frequency spectrum of the grating.

However, current known techniques for producing spectrally pure, phase continuous radio frequency chirps that are linear in frequency and very stable are limited to pulses with bandwidths less than about 400 MHz. The RF chirp can be impressed on an optical signal using an optical modulator such as an electro-optical modulator (EOM) or an acousto-optic modulator (AOM). Such limited bandwidths are inadequate to make full use of the spectral recording properties of the IBT materials, which extends over tens to hundreds of gigaHertz, and have a wide range of uses.

SUMMARY

Techniques are provided for an optical source for one single order sideband, suppressed carrier optical signal with a bandwidth that scales from over 1 gigaHertz to greater than 20 gigaHertz.

In one set of embodiments, an apparatus comprises a stable laser source configured to output an optical carrier signal at a carrier frequency. The apparatus further comprises a radio frequency electrical source configured to output an electrical radio frequency signal with a radio frequency bandwidth less than one octave. The apparatus further comprises an optical modulator configured to output an optical signal with the optical carrier signal modulated by the radio frequency signal in a plurality of orders of optical frequency sidebands. The apparatus further comprises an optical filter configured to pass one single order optical frequency sideband of the optical signal for which the one passed sideband does not overlap the sidebands of any other harmonics.

In another set of embodiments, a method comprises modulating an optical signal with an optical carrier signal by a radio frequency signal to produce a modulated optical signal with a carrier frequency and a plurality of orders of optical frequency sidebands based on the radio frequency signal. The radio frequency signal has a radio frequency bandwidth less than one octave. The method further comprises filtering the modulated optical signal to pass one single order optical frequency sideband.

In other embodiments, an apparatus comprises means for performing two or more steps of the above method.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 is a block diagram that illustrates example components of a single sideband, suppressed carrier (SSB-SC) optical source and its use to probe a target, according to an embodiment;

FIG. 7A is a block diagram that illustrates example components of an injection locking module for suppressing relative intensity noise (RIN), according to an embodiment;

FIG. 7B is a block diagram that illustrates an example spectrum of an instantaneous injected master optical signal relative to an cavity mode resonant frequency of a slave laser, according to an embodiment;

FIG. 7C is a block diagram that illustrates an example spectrum of an instantaneous output optical signal relative to the cavity mode resonant frequency of the slave laser, according to an embodiment;

FIG. 10C is a graph that illustrates an example probe waveform for a readout process, according to an embodiment;

FIG. 10D is a graph that illustrates an example readout signal based on the spectral content of FIG. 10B and the probe waveform of FIG. 10C;

DETAILED DESCRIPTION

Figure 2A:
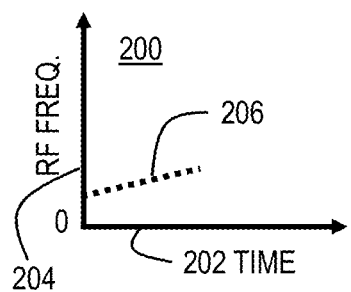
FIG. 2A and FIG. 2B are diagrams that illustrate example radio frequency input signals to an optical modulator, according to an embodiment.

A method and apparatus are described for producing extended bandwidth single-sideband suppressed carrier optical waveforms. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In the following description, embodiments of the invention are described in the context of probing the spectral content of an IBT material. However, the invention is not limited to this context. In other contexts, embodiments of the invention are applied to generating optical signals, programming IBT materials, programming or probing other materials, and processing optical signals, among other applications. For example, a broadband chirp may be superimposed with a second optical source of unknown spectral content at a photodetector. The resulting photodetector signal contains the spectrum of the second optical source as a temporal map. If the spectrum of the second source did not change during the time scale of the chirp and if the chirp is well characterized, e.g., substantively continuous ("quasi-continuous"), then the spectrum of the second source can be de-convolved from the photodetector signal. As used herein a "chirp" is a time varying signal that sweeps through a band of frequencies, one frequency at a time. The sweep may be linear (in which case the chirp is a LFM signal), piecewise linear or non-linear. The chirp may be in radio or optical electromagnetic frequencies.

1. Optical Readout

As described above, IBT materials are capable of storing spatial-spectral gratings with spectral features having bandwidths in excess of 1 GHz. Such gratings can represent meaningful information, such as the results of high-bandwidth analog optical processing, as described in Merkel. Available highly sensitive and wide-dynamic-range detectors and digitizers have bandwidths of only about up to a few hundred MHz, bandwidths that are too small by factors of 10 to 1000 or more. As described in Merkel, a frequency chirp sweeping over the IBT frequency band of interest, e.g., in excess of 1 GHz, can produce a low-bandwidth readout signal that can be detected and digitized with the low-bandwidth (<200 MHZ) high-dynamic-range devices currently available. However, current known techniques for producing chirps that are highly linear in frequency and highly stable are limited to narrowband pulses with bandwidths less than about 400 MHz in some single octave and cost-effective cases, and up to bandwidths of 3.5 GHz using wideband digital to analog conversion electronics at 20 Gs/s. Hardware to generate wider bandwidths typically have poorer performance and higher cost than lower bandwidth hardware. As described in Merkel, a low-bandwidth readout signal is generated by probing the spatial-spectral grating in an IBT material with multiple linear, stable, chirps. The readout signal is produced based on processing multiple outputs received from the IBT material after probing by the multiple chirps.

According to embodiments of the present invention, a broadband frequency chirp probe signal for low-bandwidth readout is produced.

For purposes of illustration, the following description uses an example spatial-spectral grating with spectral features that include two periodic components in frequency representing the interaction of a transmitted signal with a reflected signal having two delayed near-replicas of the transmitted signal, as may occur in applications, such as RADAR, described in Merkel. However, embodiments of the invention are not limited to this example. Embodiments of the invention may be practiced in any application where the bandwidth desired for a waveform exceeds the bandwidth of available waveforms.

Figure 10A:
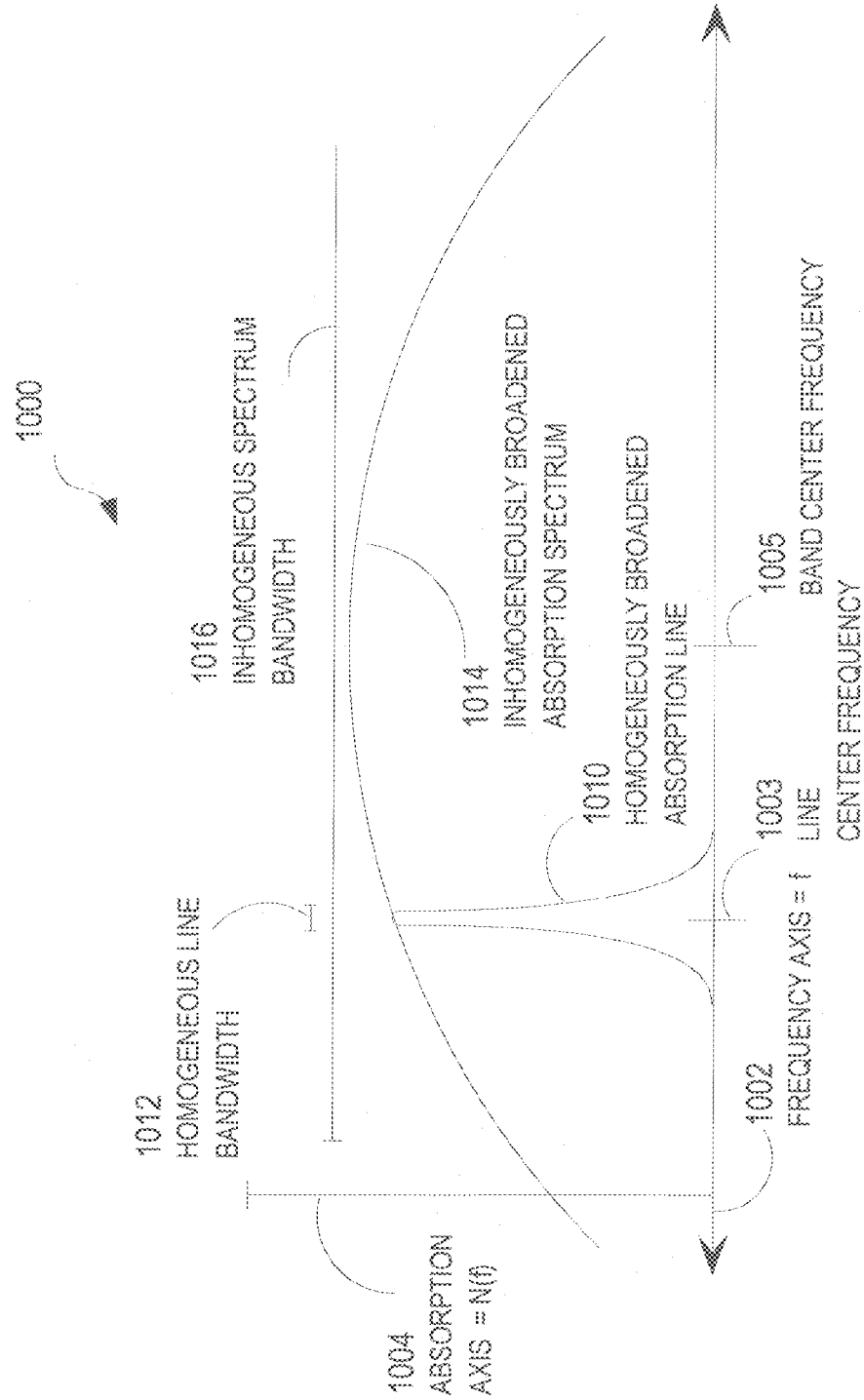
FIG. 10A is a graph that illustrates a homogeneously broadened absorption spectral line and an inhomogeneously broadened absorption spectrum in an IBT material.

FIG. 10A is a graph that illustrates a homogeneously broadened absorption spectral line 1010 and an inhomogeneously broadened absorption spectrum 1014 in an IBT material. The frequency axis 1002 represents frequencies (f), in Hz, increasing to the right. The absorption axis 1004 represents the population (N(f)) of absorbers, which are available to absorb light, and is related to the absorption of light per unit length along a spatial path into the material. The graph depicts a homogeneously broadened absorption spectral line 1010 centered on line center frequency 1003, which has a homogeneous line bandwidth proportional to the reciprocal of a time called the homogeneous dephasing time. The dephasing time is the time scale for coherent, phase-sensitive transitions between the ground state and the excited state for a homogeneous set of absorbing electrons.

The inhomogeneous broadening is typically caused by defects found in the host of the absorbing molecule or ion. These local defects, the "inhomogeneities," cause similar ions to have different resonant frequencies, but do not broaden the individual homogeneous resonances. The inhomogeneously broadened absorption spectrum 1014 has a band center frequency 1005 and an inhomogeneous spectrum bandwidth 1016, also represented by the symbol $B_M$ for the material bandwidth. The band center frequency 1005 is in the optical band, which encompasses frequencies from 100 to 1000 TeraHz (THz, 1 THz=$10^{12}$ Hz). However, the inhomogeneous spectrum bandwidth 1016, $B_M$, is typically less than a few THz—large compared to the bandwidths available for processing using other techniques, but small compared to the hundreds of THz bandwidth of the optical band.

When an electron makes the transition to the excited state because of light impinging at a particular location in the material, there is one fewer absorber at that location. Therefore, the population of absorbers decreases and the absorption decreases at that location. Members of a population of excited electrons gradually return to the ground state, and the population of absorbers, along with the absorption, returns to its initial value. The time scale associated with this process is the population decay time, which is typically much longer than the dephasing time.

For purposes of illustration, it is assumed that the bandwidth of interest of the spatial-spectral grating in the IBT material is 4 GHz around a center optical frequency f0 (i.e., the band of interest spans f0−2 GHz to f0+2 GHz). It is further assumed that there are two periodic components of interest, representing the interaction in the IBT material of a first optical signal with a second signal having two delayed near-replicas of the first optical signal. The first delay, τ1, is 0.003 microsecond (µs, 1 µs=$10^{-6}$ seconds); and the second delay, τ2, is 0.005 µs. These delays appear in the spatial-spectral grating as oscillations of absorption in the absorption spectrum with a periodicity equal to 333.3 MHz and 200 MHz, respectively, given by the reciprocals of the respective delays. This relationship is given by Equation 1

$$P = 1/\tau \quad (1)$$

wherein P is the period (in units of frequency) of a spectral component in a spatial-spectral grating which corresponds to a particular delay τ. This period P is noteworthy in that it is a period in frequency rather than a period in time—it is a property of the Fourier transform that a spike in time, such as a correlation peak at delay τ, corresponds to a periodic component in frequency. Although delays of a few nanoseconds (ns, 1 ns=$10^{-9}$ seconds=0.001 µs) are used for purposes of illustration, the same methods may be used for much shorter and much longer delays, e.g., for delays of several microseconds.

Figure 10B:
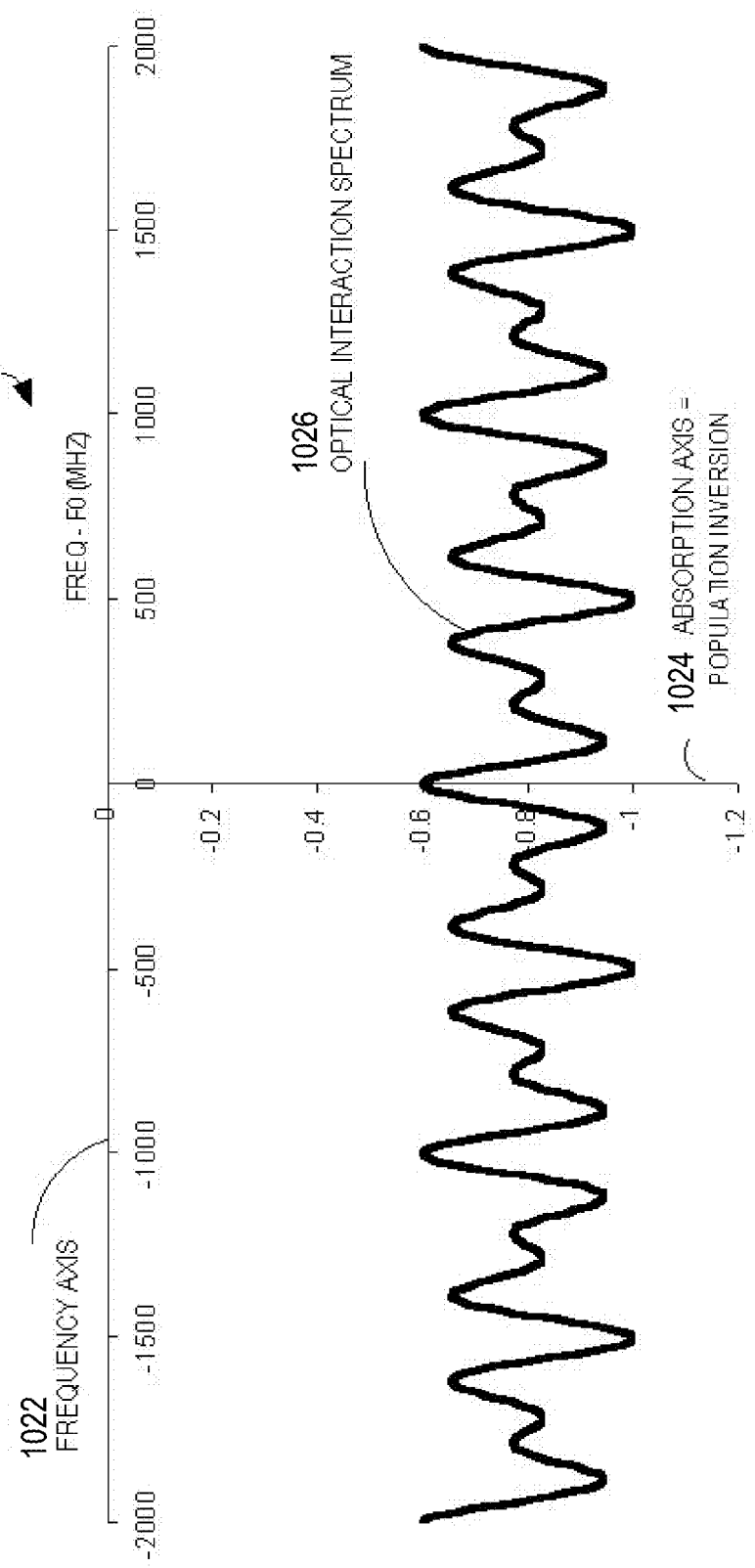
FIG. 10B is a graph that illustrates spectral content of an example spatial-spectral grating in an IBT material, according to an embodiment.

FIG. 10B is a graph 1020 that illustrates the spectral content of this example spatial-spectral grating. The frequency axis 1022 represents frequency deviation from a central processing frequency f0, in MHz, increasing to the right. The absorption axis 1024 represents the population inversion where −1 represents the original population of absorbers, all ions in their ground state (the opposite of complete inversion), 0 represents equal numbers of ions in the ground and excited states, and +1 represents a state in which all absorbers are in their excited state (complete inversion), so that no absorbers are present. This definition causes a spectral hole in absorption to appear as a spike in a plot of population inversion. The example two periodic components in frequency caused by the interaction of the signal with its two delayed replicas of equal strength form an optical interaction spectrum. The example optical interaction spectrum 1026, depicted in FIG. 10B, includes an oscillating absorption with a period P of 333 MHz and an oscillating absorption with a period S of 200 MHz corresponding to the two delays τ1, τ2, respectively.

Highly linear, phase continuous, frequency stable, wideband frequency chirps with the appropriate chirp rate are desired as the probe waveform for the readout process. The chirp rate ($\gamma$) is given by the chirp bandwidth ($B_C$) divided by the temporal extent ("duration") of the chirp ($T_C$), as shown in Equation 2.

$$\gamma = B_C/T_C \quad (2)$$

It is assumed for purposes of illustration that a useful duration is about a millisecond (ms, 1 ms=$10^{-3}$ seconds), on the order of the population decay time for some IBT materials and the pulse rate for some RADAR applications; therefore $T_C$=1000 μs. In the illustrated example, the bandwidth of interest is 4 GHz (4000 MHz); therefore $B_C$=4000 MHz. Consequently, a useful chirp rate, in the illustrated embodiment, is about $\gamma$=4 MHz/μs.

FIG. 10C is a graph 1030 that illustrates an example desired probe waveform for the readout process. The horizontal time axis 1032 represents time during the probe waveform, increasing to the right from 0 to 1000 μs. The vertical frequency axis 1034 represents frequency deviation from the central processing frequency f0, in MHz, increasing upwards. This probe waveform is composed of an extended chirp, as suggested in Merkel. The example probe waveform is an extended chirp 1036 that has duration of one millisecond, that has a constant chirp rate ($\gamma$=4 MHz/μs), and that, consequently, spans the entire 4000 MHz bandwidth of interest in the illustrated embodiment.

In general, the probe waveform produces multiple high-bandwidth output signals from the spatial-spectral grating in the IBT material, a transmission and zero or more echoes. The transmission includes high-bandwidth information from the absorption spectrum in the spatial-spectral grating. Each echo is a reduced amplitude replica of the probe waveform delayed by a time equal to the delay in the signals that interacted to form the spatial-spectral grating. If no delayed replica interacts to form the spatial-spectral grating, then no echo is typically produced.

To generate a low-bandwidth readout signal that can be detected with sensitive high-precision detectors and digitizers, the high-bandwidth output signals are combined to produce a low-bandwidth beat with a beat frequency $F_B$ that is proportional to the delay τ and the chirp rate $\gamma$, as shown in Equation 3a.

$$F_B = \gamma * \tau \quad (3a)$$

As is well known in the art, beat frequencies are formed at both the sum and difference in frequency of two simultaneous signals at a detector. The difference frequency is of use in the illustrated application because the difference is a detectable frequency. With delayed linear chirped signals, as used here, the frequency difference is steady and equal to the chirp rate κ times the delay τ. Each beat frequency commences after the start of the output signal by the delay time corresponding to the beat. In terms of the period P (in units of frequency) of the oscillations in the absorption spectrum, this relationship is expressed in Equation 3b.

$$F_B = \gamma/P \quad (3b)$$

If the spatial-spectral grating contains delays, the low-bandwidth readout signal includes a linear superposition of the beat frequencies associated with all the delays. Table 1 gives values for the delays τ, periods P, and beat frequencies $F_B$ for the illustrated example of a spatial-spectral grating, and for several values of the constant chirp rate $\gamma$. As can be seen in Table 1, the beat frequencies, $F_B$, are low bandwidth signals that are easily measured by high-dynamic-range detectors and digitizers operating in the megaHertz range. A readout signal with such beat frequency components provide a low-bandwidth temporal map of the spectral features of interest in the interaction absorption spectrum. Any beat frequencies that can be measured well can be used, such as the beat frequency in the third line of Table 1.

TABLE 1

Values of spectral features for example spatial-spectral grating.

| τ (μs) | P (MHz) | $F_B$ (MHz) for $\gamma$ = 2 MHz/μs | $F_B$ (MHz) for $\gamma$ = 4 MHz/μs | $F_B$ (MHz) for $\gamma$ = 8 MHz/μs |
|---|---|---|---|---|
| 0.003 | 333.3 | 0.006 | 0.012 | 0.024 |
| 0.005 | 200 | 0.010 | 0.020 | 0.040 |
| 5 | 0.2 | 10 | 20 | 40 |

FIG. 10D is a graph 1040 that illustrates an example time trace 1046 of a readout signal based on the spectral content of FIG. 10B and the probe waveform of FIG. 10C. The horizontal time axis 1042 represents time after a signal is received at the detector, increasing to the right from 0 to 1000 μs. The vertical amplitude axis 1044 represents amplitude of the readout signal in arbitrary units. The illustrated readout signal represented by trace 1046 includes two low-bandwidth beats, one at 0.012 MHz and another at 0.020 MHz corresponding to the two delays τ1, τ2 and a constant chirp rate of 4 MHz/μs. These appear as temporal oscillations with temporal periods of about 83 μs and 50 μs, respectively. The two temporal oscillations are delayed by 0.003 μs and 0.005 μs, respectively; such delays are too small to see in FIG. 10D, or to measure with MHz range detectors and digitizers. Thus the delays 0.003 μs and 0.005 μs are determined based on the chirp rate y, the easily measured beat frequencies $F_B$ at 0.012 MHz and 0.020 MHz in the low-bandwidth temporal oscillations, and Equation 3a. In other embodiments, with longer delays τ, the periods of the beats are much smaller, and hundreds or thousands of oscillations are observed in the 1000 μs of a readout signal.

2. Overview of Optical Chirp Source

A method and apparatus are described to generate a wideband optical waveform, such as a chirp, that is a single order sideband with a suppressed carrier (SSB-SC). The method includes modulating a radio frequency (RF) or microwave signal or waveform onto an optical carrier and optically filtering the output of the modulation to achieve the SSB-SC optical waveform. The optical carrier is typically that of a coherent stable laser and defined as having a frequency $f_L$ that becomes a carrier frequency $f_{CARRIER}$ for a modulated waveform. When a signal is modulated onto an optical carrier, multiple order optical sidebands are generated that have optical frequencies both above (upper sidebands) and below (lower sidebands) the optical carrier frequency. For each frequency component of the signal, multiple optical upper and lower sidebands are generated, whose optical frequencies are separated from the laser carrier by harmonics of the RF frequency of the component being considered. For broadband signals, upper and lower harmonic sidebands are generated for each frequency component of the signal. Throughout this application, a single optical frequency sideband will be used to refer to one of the set of either upper or lower sidebands produced by a specific harmonic. This is also called a single harmonic sideband or a single order sideband. The modulation operation of taking an RF waveform and modulating into a carrier is often limited to using less than a single octave in RF frequency, so that a single optical frequency sideband can be isolated without substantial overlap with other optical frequency sidebands. SSB-SC here refers to isolating one of these optical frequency sidebands from the set of upper or lower optical frequency sidebands by means of an optical filter. The apparatus includes lasers, electro-optical modulators, RF drive electronics, and optical filters, among others. The resulting waveforms and proposed techniques can also assist in recovering optical spectral features in a target optical spectrum and allow the determination of spectral content of a target optical spectrum during one or more optical interactions (including, for example, optical absorption, transmission, reflection, diffraction, dispersion, and scattering) of the target optical spectrum FIG. 1 is a block diagram that illustrates example components of a single sideband, suppressed carrier (SSB-SC) optical source 100 and its use to probe a target 120, according to an embodiment. In the illustrated embodiment, the SSB-SC optical source 100 includes a stable laser 102, an optical modulator 104, a radio frequency (RF) source 106, an optical filter 108, a polarization controller 110, an optical amplifier 112, a frequency doubler 114 and an injection locking module 116. Although components are shown as integral blocks in a particular order for purposes of illustration, in other embodiments one or more components are arranged in a different order or are omitted or the functions of one or more components are split among a plurality of different components that serve the same functions, or the functions of two or more components are combined, or the source 100 is changed in some combination of ways. For example, in some embodiments the optical amplifier 112 is moved after the frequency doubler 114 or after the injection locking module 116, or multiple optical amplifiers are included.

In the illustrated embodiment, the output of the source 100 is used as a read input signal 118 to probe the spectral content of a target 120. The probing operation involves a target 120, detector 130 and digital signal processor 132. As a result of the interaction of the read input signal 118 with the target, a read output signal 122 is produced that is measured at optical detector 130. An electronic signal output by the detector 130, as indicated by the dotted arrow, is input to the digital signal processor 132, such as a computer described below with reference to FIG. 11 or a chip set described below with reference to FIG. 12, to determine the spectral content of the target 120.

It is often desirable that the read input signal is a chirp that sweeps through a band of optical frequencies one frequency at a time. In some embodiments, the read input signal is a LFM chirp in which the optical frequency changes at a constant rate, as described above. In other embodiments, the chirp includes a sweep through optical frequencies at a non constant rate, including both positive and negative rates in some embodiments. In some embodiments, the use of a single frequency at a time within the chirp allows the source 100 to include such components as the injection locking module 116. In some embodiments, a center frequency of an output is chosen to make use of other special properties, such as the availability of a frequency doubler for optical wavelengths near 189 THz (optical wavelength of about 1586 nanometers, nm, 1 nm=$10^{-9}$ meters) that doubles frequencies to near 378 THz (optical wavelengths of about 793 nm). These techniques, alone or in combination, allow one to effectively and efficiently extend chirps to usefully large bandwidth that scale from over 1 GHz to beyond 20 GHz.

The stable laser 102 is configured to output a single frequency for an extended time. The stable laser 102 is often controlled, at least in part, by a computer or chip set as described in more detail below with reference to FIG. 11 and FIG. 12.

The optical modulator 104 is configured to modulate the laser output with a frequency signal from a RF source. For example, an electro-optical modulator (EOM) well known in the art is used.

The RF source 106 is configured to introduce a chirp with as wide a bandwidth as is achievable with RF components, to modulate an optical carrier from the laser and be multiplied by the subsequent components of the source 100. The output of the RF source 106 is an electrical signal as indicted by the dotted arrow. The RF source 106 is often controlled by a computer or chip set as described in more detail below with reference to FIG. 11 and FIG. 12. In various embodiments, RF source 106 includes signal generators, arbitrary waveform generators (AWG), digital-to-analog converters (DAC), direct digital synthesizers (DDS), RF antennas, RF amplifiers, RF switches, RF mixers, RF filters, RF connectors and RF cables. Several embodiments of RF source 106 are described in more detail below.

The optical filter 108 is configured to pass a single sideband. Several embodiments of optical filter 108 are described in more detail below. In some embodiments, the optical filter is tunable and is controlled, at least in part, by a computer or chip set as described in more detail below with reference to FIG. 11 and FIG. 12. In various embodiments, the optical filter is an adjustable or fixed bandwidth, tunable frequency, optical filter.

The polarization controller 110 is configured to reduce power loses by conversion among polarization states, as described in more detail below. In various embodiments, the polarization controller includes one or more polarization-maintaining optical fibers.

The optical amplifier is configured to increase the power of the optical signal at one or more points along an optical path from modulator 104 to target 120.

The frequency doubler 114 is configured to double the bandwidth of incident light. Any frequency doubler known in the art may be used. An embodiment of frequency doubler 114 is described in more detail below.

The injection locking module 116 is configured to suppress relative intensity noise (RIN) in some embodiments, and simultaneously amplify the optical signal of interest in some embodiments, and is described in more detail below. In various embodiments, any RIN suppression mechanism may be used.

In addition to the above components, in various embodiments the source 100 includes fiber-optical circulators, fiber couplers, and free-space optical components (i.e. mirrors, lenses, polarizers, open space, vacuum space, etc.) collectively referenced hereinafter as optical couplers.

Figure 2B:
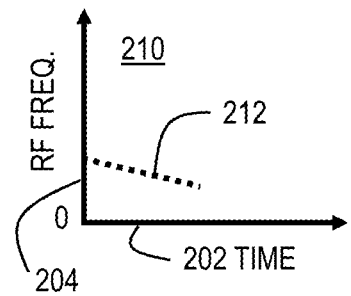

FIG. 2A and FIG. 2B are diagrams that illustrate example radio frequency input signals to an optical modulator, according to an embodiment. The horizontal axis 202 represents time and the vertical axis represents an RF frequency. In diagram 200 the RF frequency of trace 206 that is used as RF input to an EOM increases linearly, and is represented by a dotted line. In diagram 210 the RF frequency of trace 212 that is used as RF input to an EOM decreases linearly, and is represented by a dotted line. For both traces, the maximum frequency is less than twice the minimum frequency, so each trace represents a chirp with a bandwidth that is less than one octave, called sub-octave bandwidth hereinafter.

Figure 2C:
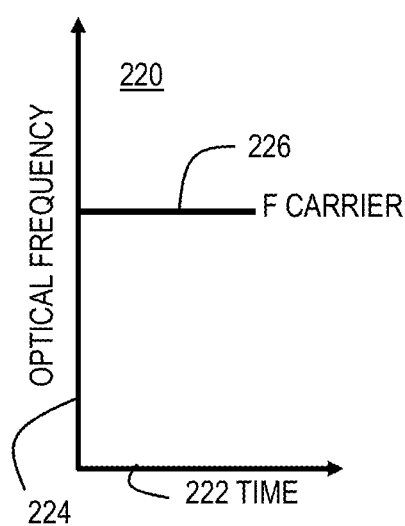
FIG. 2C is a diagram that illustrates an optical output of a stable laser, according to an embodiment.

FIG. 2C is a diagram 220 that illustrates an optical output of a stable laser, according to an embodiment. The horizontal axis is time 222 and the vertical axis is optical frequency 224. The optical signal output 226, represented by a solid line, is at a single constant frequency $f_L$ called the carrier frequency $f_{CARRIER}$.

Figure 2D:
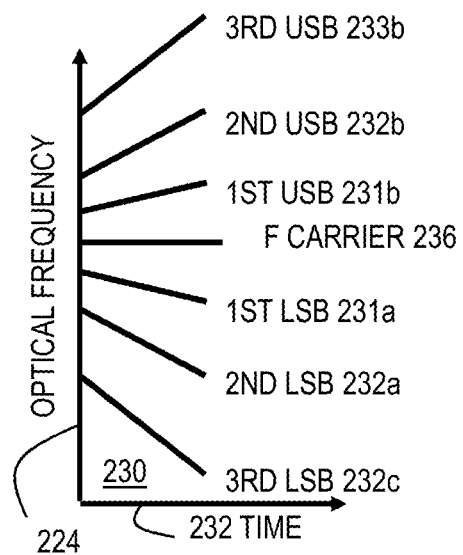
FIG. 2D is a diagram that illustrates an optical output of an optical modulator when modulated by the radio frequency input signals of FIG. 2A or FIG. 2B, according to an embodiment.

FIG. 2D is a diagram 230 that illustrates an optical output of an optical modulator when modulated by the radio frequency input signals of FIG. 2A or FIG. 2B, according to an embodiment. When modulated by either RF chirp 206 or RF chirp 212 in an EOM, the output from the EOM includes the carrier frequency optical signal 226 and first order side lobes ($1^{st}$ lower side band, LSB, 231a and $1^{st}$ upper side band, USB, 231b) as well as second order side lobes ($2^{nd}$ LSB 232a and $2^{nd}$ USB 232b) and third order side lobes ($3^{rd}$ LSB 233a and $3^{rd}$ USB 233b) as well as others, not shown.

Thus FIG. 2A-FIG. 2D show an RF source driving an optical modulator acting on a stable laser. The optical driving source signal 226, plotted versus time at frequency $f_{CARRIER}$, is ideally a single frequency, stable laser. The RF source is a linear frequency modulated signal 206 or 212, shown as a positive or negative linear slope plotted in frequency versus time in diagrams 200 and 210, respectively. To prevent second order and higher side lobes (also called harmonics) generated in the EOM from entering any sideband of interest, modulation is restricted to sub-octave bands. After modulation, multiple modulator-generated sidebands appear around the optical carrier. Diagram 230 shows six of these, which are the first three on each side of the laser carrier; however, the sidebands extend to the full bandwidth of the modulator.

Figure 2E:
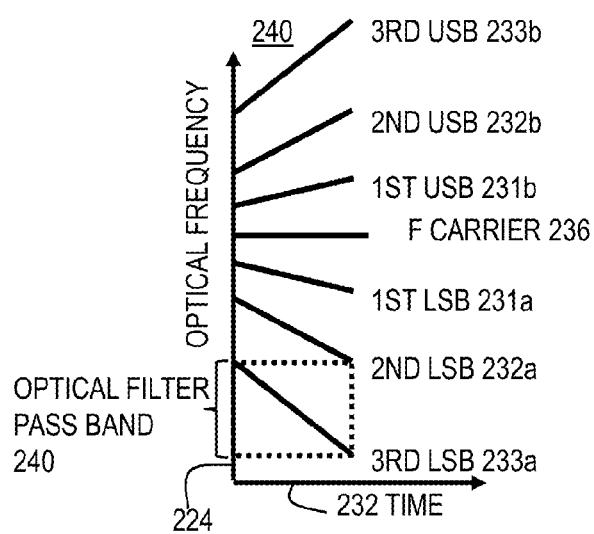
FIG. 2E is a diagram that illustrates an example pass band of an optical filter relative to the optical output of an optical modulator, according to an embodiment.
Figure 2F:
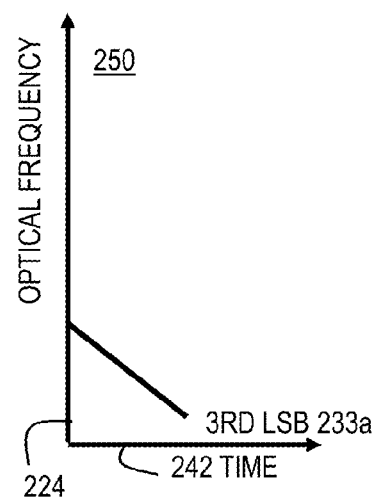
FIG. 2F is a diagram that illustrates an example output of the optical filter, according to an embodiment.

The optical filter acts to filter one of these sidebands selectively, leaving only that sideband and attenuating everything else. FIG. 2E is a diagram 240 that illustrates an example pass band 240 of an optical filter relative to the optical output of an optical modulator, according to an embodiment. The figure depicts the filter as a frequency band 240 selected to output a single sideband suppressed carrier (SSB-SC) signal. In this case, the filtered sideband was selected as the third LSB, meaning that this sideband is lower in frequency than the laser frequency $f_{CARRIER}$. In this case, the third LSB corresponds to having the opposite direction slope and three times the chirp rate of the driving RF signal 206 (or the same direction of driving RF signal 212). The third upper sideband (USB) is the mirror image of the third LSB around the optical carrier. The second USB and LSB have the same mirror relationship around the optical carrier, but the chirp rate is twice that of the driving source. The first USB and LSB have the same mirror relationship around the optical carrier, but the chirp rate is the same as the driving source. FIG. 2F is a diagram 250 that illustrates an example output 233a of the optical filter, according to an embodiment.

In principle, one can select any of the EOM generated sidebands for use. It is desirable for the highest RF input frequency to be limited to (n+1)/n times the lowest RF input frequency when using the $n^{th}$ order harmonic to prevent that particular sideband from overlapping with adjacent sidebands. FIG. 2F shows the interesting case where the selected sideband is the third LSB. It is advantageous to pass that sideband in optical filter 108 because that sideband covers three times the bandwidth compared to that of the RF driving source. The chirp rate at this point is three times as fast as the RF driving source; and the highest input frequency is advantageously limited to 1.33× the lowest input frequency to prevent sideband overlap.

3. Radio Frequency (RF) Sources

Figure 3A:
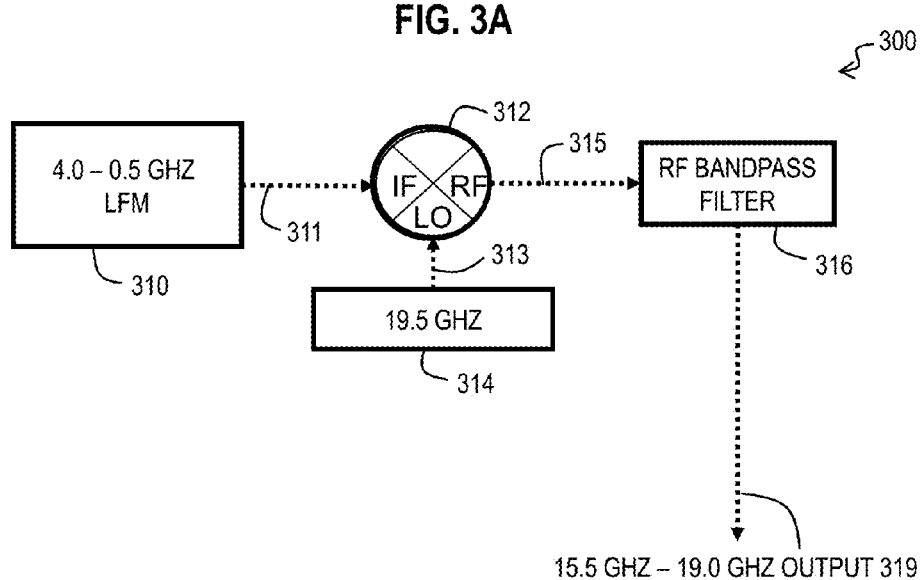
FIG. 3A is a block diagram that illustrates an example radio frequency source, according to one embodiment.

FIG. 3A is a block diagram 300 that illustrates an example radio frequency source, according to one embodiment. The illustrated embodiment is used to generate an RF waveform that is 4/3× limited to obtain an optical modulated waveform with a bandwidth over 10 GHz. In this example, a source 310 of a 3.5 GHz bandwidth, negative linear frequency RF chirp 311 that sweeps from 4.0 GHz to 0.5 GHz is upconverted to a 15.5 GHz to 19.0 GHz chirp 315 by means of an RF mixer 312 driven by a 19.5 GHz signal 313 generated by local oscillator clock 314. The lower sideband of the upconverted signal is passed through a bandpass filter 316, creating a linear RF frequency chirp 319 from 15.5 GHz to 19.0 GHz. To indicate that these are RF signals, they are represented by dotted lines.

The upconverted RF chirp 319 is then modulated onto an optical carrier signal output by laser 102 via an optical modulator 104. Multiple sidebands are created around the carrier. The optical filter selectively filters the desired sideband. For the case of the $3^{rd}$ LSB, this signal has an equivalent bandwidth of 10.5 GHz that has a frequency span from 46.5 GHz to 57.0 GHz with respect to the optical carrier. This optically modulated, sub-octave waveform has a bandwidth that is three times larger than the original modulated multi-octave RF waveform and does not overlap with any other modulated optical sidebands, as shown in FIG. 2E and FIG. 2F. The first LSB extends from 15.5 to 19.0 GHz below the optical carrier frequency, the second LSB extends from 31.0 to 38 GHz below the optical carrier frequency; and the third LSB extends from 46.5 to 57.0 GHz below the optical carrier frequency.

In another embodiment, multiple sub-octave, segmented, linear frequency modulated RF signals were stitched together by means of a RF switching scheme implemented in one embodiment of the RF source 106. The EOM modulated the stitched RF signal onto an optical carrier—again creating multiple upper and lower sidebands centered on the stable laser, optical carrier frequency. An optical filter was chosen to selectively filter the third LSB, which has a chirp rate and a bandwidth that are three times greater than the original RF driving source segment.

In various embodiments, a segmented RF chirp generator consists of any RF generation equipment, such as an arbitrary waveform generator (AWG), digital-to-analog Converter (DAC), or RF signal generators, alone or in some combination. The RF generation equipment is configured or dynamically programmed to produce a continuously running, linear frequency modulated waveform. In some embodiments, a linear frequency modulated waveform is generated using an AWG such as a Tektronix AWG7102. This device has a sampling frequency of 20 giga-samples per second (Gsps, 1 Gsps=$10^9$ samples per second) and is capable of generating a linearly chirped RF waveform (also called a linear RF chirp herein) with the highest frequency being 4.5 GHz. A limitation of this device is in the spur-free dynamic range, which decreases with an increase of output frequency. The example embodiment shown herein uses a 3.5 GHz bandwidth linear frequency modulated waveform that spans from 4 GHz to 0.5 GHz.

Figure 3B:
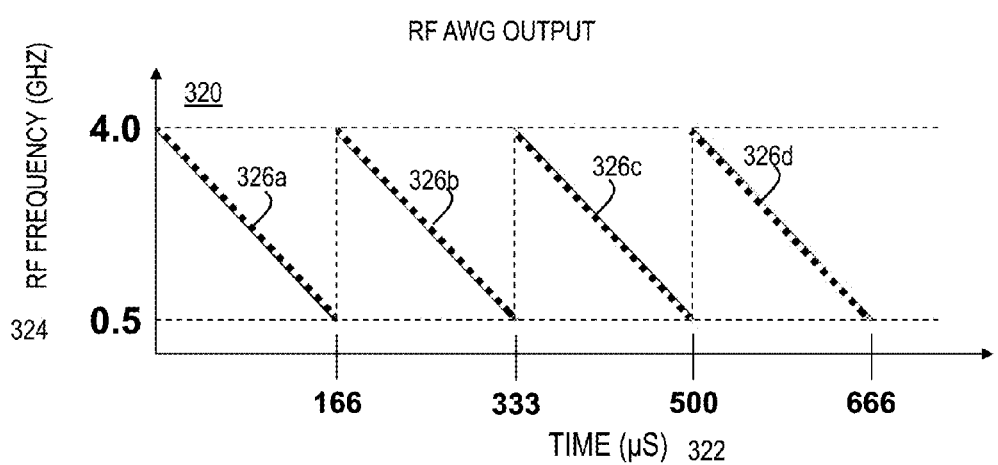
FIG. 3B is a diagram that illustrates an example radio frequency output from an arbitrary wave generator (AWG) used in a radio frequency source, according to another embodiment.

As mentioned, the RF AWG is programmed to output a continuously running linear frequency modulated waveform that repeats indefinitely creating multiple segments. An example of a continuously running linear frequency modulated waveform is shown in FIG. 3B. FIG. 3B is a diagram 320 that illustrates an example radio frequency (RF) output from an AWG used in a radio frequency source 106, according to another embodiment. The horizontal axis 322 is time in microseconds (μs, 1 μs=$10^{-6}$ seconds); and the vertical axis 324 is RF frequency in gigahertz (GHz). In this figure, only the first four segments 326a through 326d are shown (collectively referenced hereinafter as RF AWG segments 326). For the example used herein, each RF AWG segment 326 is programmed to chirp down in frequency linearly from 4 GHz to 0.5 GHz in a time interval of 166 µs.

Figure 3C:
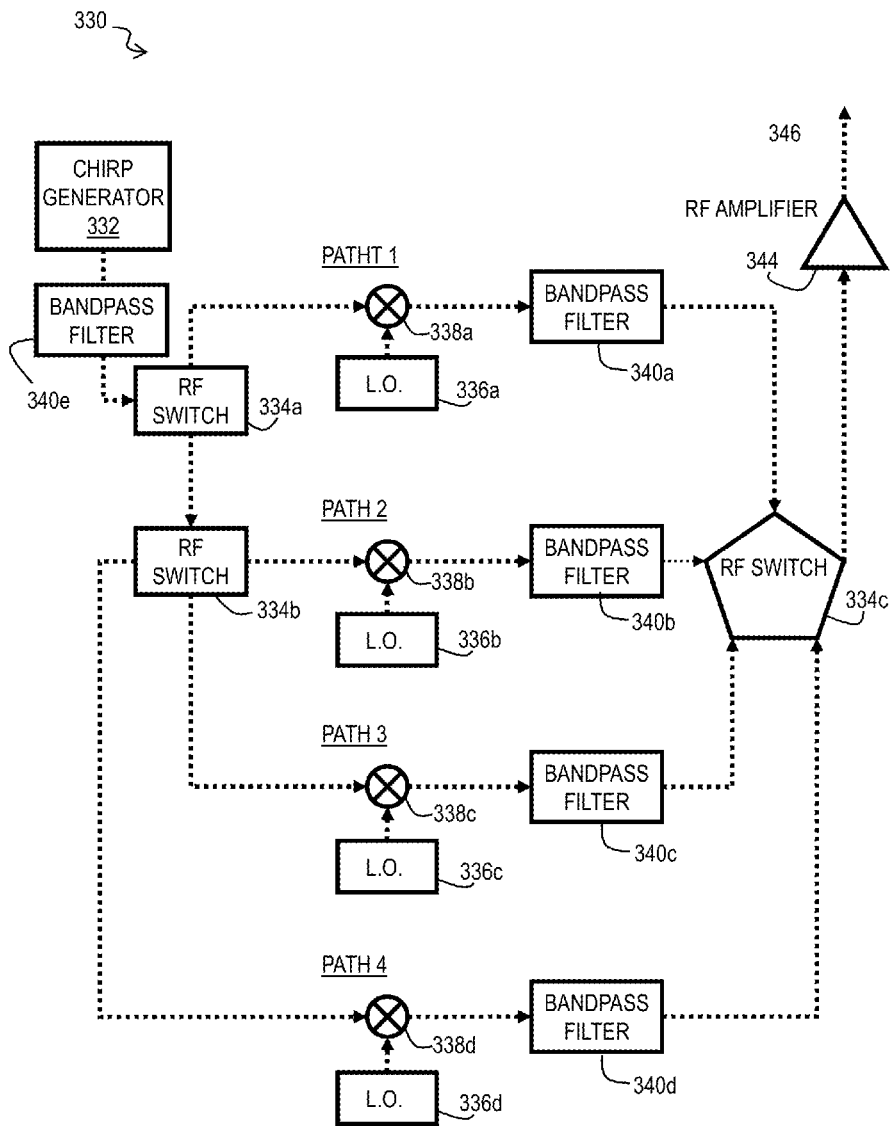
FIG. 3C is a block diagram that illustrates an example radio frequency source that uses the radio frequency output from the arbitrary wave generator (AWG), according to an embodiment.

These chirped waveform segments then pass through a switching stage creating four separate paths, shown in the block diagram of FIG. 3C. FIG. 3C is a block diagram that illustrates an example radio frequency source 330 that uses the radio frequency output from the AWG, according to an embodiment. The depicted RF signals are represented by dotted arrows. The RF source 330 is a particular embodiment of RF source 106; and includes chirp generator 332 (such as an RF AWG), RF switches 334*a* through 334*c*, RF local oscillators (LOs) 336*a* through 336*d*, RF mixers 338*a* through 338*d*, and RF bandpass filters 340*a* through 340*e* (collectively referenced hereinafter as RF switches 334, RF LO 336, RF mixers 338 and RF bandpass filters 340, respectively). In the illustrated embodiment, the RF source 330 also includes an RF amplifier 344. The RF output 346 is an extended bandwidth RF signal that is next modulated onto a laser signal at optical modulator 104.

Each segment is passed through a bandpass filter 340*e* to improve the spur free dynamic range (SFDR) of the waveform before being sent to the intermediate frequency (IF) input of separate mixing stages 338 on different paths through RF switches 334*a* and 334*b*. Each mixer 338 is ideally driven by a dedicated local oscillator 336 producing a continuous wave (CW) signal at a drive amplitude designed for operation by each individual mixer 338. The CW frequency outputs of the local oscillators 338 are designed to be separated by a frequency span that is slightly less than the initial waveform produced by the RF chirp generator 332. The mixers 338 are used to up-convert the initial multi-octave waveform from generator 332 onto a high frequency RF carrier, creating a sub-octave segment. By using multiple mixers 338 and LOs 336, multiple upconverted segments can be created on different paths. In the example embodiment provided herein, four separate mixing paths create four upconverted segments. Each upconverted segment is then passed through an appropriate bandpass filter 340*a* through 340*d*, which is beneficial in attenuating carrier leakage, the unwanted sideband, and out of band spurs generated by the mixing stages in RF mixers 338. The four separate segments are recombined at a final RF switching stage in RF switch 334*c*. In various embodiments, the RF switches 334 are multi-pole, single throw switch, or an array of switches, and the one or more switches of RF switch 334*c* are capable of operating across the entire bandwidth of the combined upconverted segments.

A precision delay generator or similar hardware (not shown) controls the timing of the switches. The delay generator used in this example embodiment controls the switches in a manner as to allow Path 1 to pass first, followed by Path 2 second, Path 3 third and Path 4 fourth. Each upconverted RF chirp slightly overlaps the next in frequency, in order to ensure that there are no gaps in the full RF spectral coverage. This method of RF stitching produces a single output waveform equivalent to the bandwidth of the initial chirped RF waveform multiplied by the number of segments in the RF system. Once the full stitched waveform has been created at the end of the final path (Path 4 in this case), the delay generators continuously repeat the process sequentially transmitting each path. The process creates a continuously running, wideband RF chirp. The use of multiple segments allows the chirp generator 332 to be operated in a limited spur free range in some embodiments, as described in more detail below, and to still provide an adequate RF chirp as output signal 346.

Figure 3D:
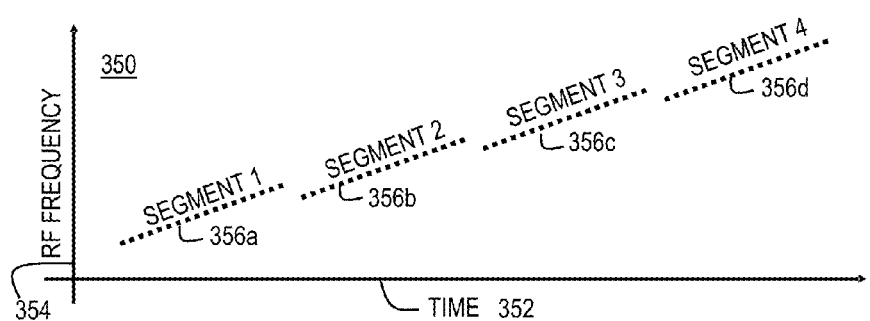
FIG. 3D is a diagram that illustrates an example radio frequency output as a function of time from the radio frequency source of FIG. 3C, according to an embodiment.
Figure 3E:
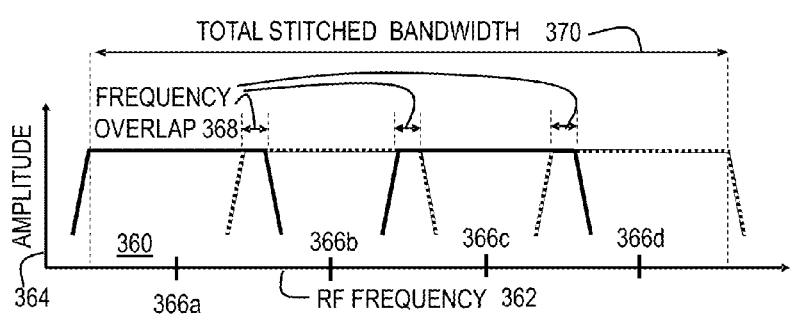
FIG. 3E is a diagram that illustrates an example radio frequency amplitude as a function of radio frequency from the radio frequency source of FIG. 3C, according to an embodiment.

FIG. 3D is a diagram 350 that illustrates an example radio frequency output as a function of time from the radio frequency source of FIG. 3C, according to an embodiment. The horizontal axis 352 is relative time and the vertical axis 354 is relative RF frequency. The upconverted RF chirp segments 356*a* through 356*d* are plotted as dotted line segments. FIG. 3E is a diagram 360 that illustrates an example radio frequency amplitude as a function of radio frequency from the radio frequency source of FIG. 3C, according to an embodiment. The horizontal axis 362 is relative RF frequency and the vertical axis 364 is relative amplitude. Amplitudes traces for the second and fourth upconverted segments are dashed to distinguish them from amplitudes traces of the first and third upconverted segments. The four segments are centered on RF frequencies 366*a*, 366*b*, 366*c* and 366*d*, respectively. There is a frequency overlap 368 between adjacent segments. The four linear frequency modulated RF upconverted segments are stitched together to create a single, linear frequency modulated RF waveform with a bandwidth 370 about four times the bandwidth of a single upconverted segment. Segment frequency overlap 368 produced by an example switching source 330 ensures no gaps between segments. The stitching of the segments is performed, for example, by switch 334*c* before modulating the wideband RF waveform 346 onto an optical carrier via an electro-optical modulator (EOM).

In various embodiments, RF design considerations are made to produce a stitched waveform that is entirely sub-octave (e.g., 11 GHz to 21 GHz). These considerations include choosing appropriate mixers 338, LOs 336, and filters 340 with high frequency operation near the target RF waveform bandwidth. An important benefit of designing the stitched wideband readout to be sub-octave is eliminating the possibility of introducing second order and higher harmonics of any optical read input signal 118 into the signal detected from the optical read output signal 122, thus improving the dynamic range of the system depicted in FIG. 1.

In some embodiments, the stitched RF chirp includes several (e.g., 3) large 3.5 GHz bandwidth segments that are used to get about 10 GHz or more of RF bandwidth. As described above, some embodiments use a 3.5 GHz bandwidth RF chirp extending from 0.5-4.0 GHz produced by the Tektronix AWG7102 repeated in 3 segments to get 10.5 GHz RF from ~11-21.5 GHz, where a first upconverted segment is over 11-14.5 GHz; a second upconverted segment is over 14.5-18.0 GHz; and a third upconverted segment is over 18.0-21.5 GHz. This embodiment relies on a relatively high cost RF feed and high cost AWG. However, in embodiments using the higher order optical sidebands, such as the 3rd order optical sideband, then a total stitched RF bandwidth of only a about 3.5 GHz is desired. This means that, in various embodiments, only one segment of 3.5 GHz is used, or several segments output by a lower cost AWG are used, both simplifying the setup or reducing RF hardware costs or both.

Thus in some embodiments, multiple segments are employed using lower bandwidth segments. However, having 20 segments that have a small bandwidth of 0.5 GHz each to achieve the 10 GHz RF drive signal using the $1^{st}$ order sideband of the modulated optical signal involves working with more than about 3 or 4 segments, which can be difficult to implement practically. Thus in some desirable embodiments, three or four segments are used to create lower bandwidth sub-octave RF waveforms. For example, in some embodiments 3 segments each of about 1.2 GHz (readily generated from a DDS board between 1.5-2.7 GHz) are mixed onto various RF carriers to get an aggregate of 3.6 GHz RF drive signal. These 3 segments include a first segment (e.g., segment 356a) over 15.5-16.7 GHz; a second segment (e.g., segment 356b) over 16.7-17.9 GHz; and a third segment (e.g., 356c) over 17.9-19.1 GHz. This solution has the advantage of relying on a lower cost dedicated RF feed and lower cost AWG/DDS components.

Figure 4A:
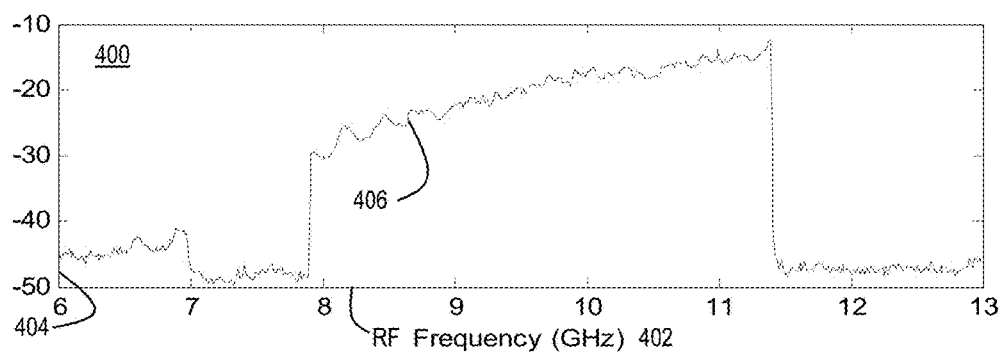
FIG. 4A is a graph that illustrates an example amplitude trace from a segment of a radio frequency source, according to an embodiment.

As described above, in some embodiments, the frequency response of the RF chirp source 106 is comprised of segments, which each go through various paths of RF hardware, e.g., RF source 330. The frequency response of each hardware component is not always flat in amplitude, and the amplitude can fluctuate over the waveform bandwidth. The cumulative effect is due to the various amplitude shaping caused by the components in the RF signal chain including mixers 338, filters 340, cables, and the AWG 332. FIG. 4A is a graph 400 that illustrates an example amplitude trace 406 from a segment of a radio frequency source, according to an embodiment. The horizontal axis 402 is RF frequency in gigahertz (GHz); and, the vertical axis 404 is amplitude in deciBels (dB, 1 dB=10*$\log_{10}$ of ratio of power of signal to power of reference signal) relative to the output of the generator 332.

Figure 4B:
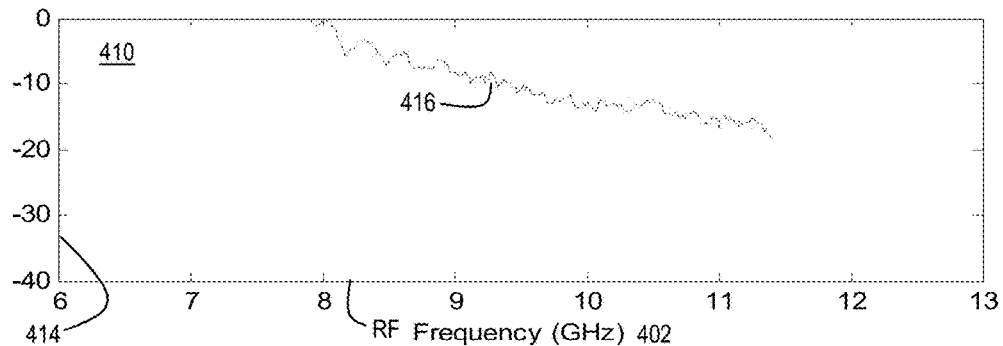
FIG. 4B is a graph that illustrates an example amplitude shaping trace input to a segment of a radio frequency source to flatten an amplitude trace from an output of the radio frequency source, according to an embodiment.

To improve amplitude flatness, in some embodiments, the linear frequency modulated waveform output from the AWG (e.g., chirp generator 332) is shaped by the inverse of the amplitude transfer function of the RF signal chain. An example of the uncorrected first segment is shown in FIG. 4A and its inverse amplitude shape used for correction is shown in FIG. 4B. FIG. 4B is a graph 410 that illustrates an example amplitude shaping trace 416 input to a segment of a radio frequency source to flatten an amplitude trace from an output of the radio frequency source, according to an embodiment. The horizontal axis 402 is as described for FIG. 4A, and the vertical axis 414 is amplitude in dB. FIG. 4A and FIG. 4B show spectrum analyzer traces of laboratory data for a 3.5 GHz bandwidth, linear frequency modulated waveform produced by a Tektronix AWG7102. The waveform is upconverted in frequency by a mixing stage with a dedicated LO. The upper trace 406 shows the amplitude profile of the first segment after being passed through the RF chain. This waveform has no amplitude correction algorithm applied and has an amplitude variation of ~10 dB over the waveform bandwidth.

The lower trace 416 shows the amplitude profile of the shaping waveform used to flatten the RF segment output to produce an amplitude variation of ~2 dB. By shaping the waveform with the inverse of the RF signal chain amplitude transfer function, the RF source 106 generates segments with much flatter amplitudes. Since each waveform has its own separate path comprised of separate RF components, each waveform is applied separately to each individual path in some embodiments. In some embodiments, this method relies on the ability to output a series of different waveforms from the RF source generator, e.g., chirp generator 322. While FIG. 4A shows ~2 dB amplitude fluctuations, much better correction responses (e.g., ~0.1 dB) could be obtained from advanced techniques, such as using well defined fixed RF paths, with finer calibration measurements and multiple iterations of a correction routine being applied. The results in FIG. 4A are typical from one iteration and meant to be illustrative only. Additionally, in some cases when using an optical injection locking stage for RIN suppression that is further down the component chain, ~2 dB variations can be sufficient for driving that RIN suppression device.

Figure 4C:
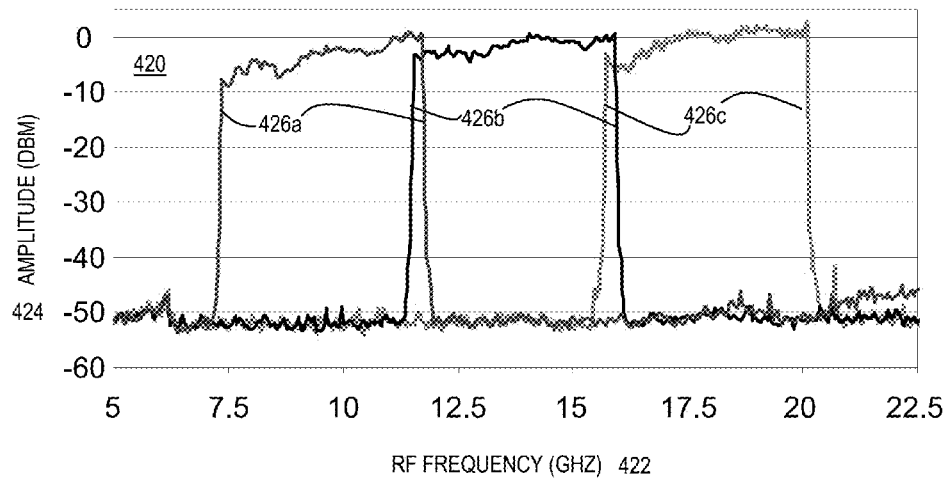
FIG. 4C is a graph that illustrates an example amplitude trace from three segments of a radio frequency source, according to an embodiment.

An example embodiment includes a series of three segmented, linear frequency modulated waveforms. A spectrum analyzer trace showing the amplitude profiles of the three linear frequency modulated waveforms after passing through their individual RF paths is shown in FIG. 4C. FIG. 4C is a graph 420 that illustrates an example amplitude trace from three segments of a radio frequency source, according to an embodiment. The horizontal axis 422 is RF frequency in gigaHertz (GHz); the vertical axis 424 is amplitude in dB relative to one milliWatt (dBm), where 1 milliWatt, mW, $=10^{-3}$ Watts. The amplitude traces 426a, 426b, 426c of three upconverted segments are plotted (collectively referenced hereinafter as segment amplitude traces 426). Each segment is upconverted from an RF AWG outputting a continuously running waveform. Each segment passes through a separate RF source path containing RF components capable of operating over the bandwidth of each upconverted segment. This creates three waveforms that have varying amplitude profiles, as shown by segment amplitude traces 426 from a spectrum analyzer. This creates three waveforms that have varying amplitude profiles. Amplitude correction shaping was then applied to each individual segment, e.g., by controlling the AWG with a computer, to reduce the amplitude variations within each segment.

Figure 4D:
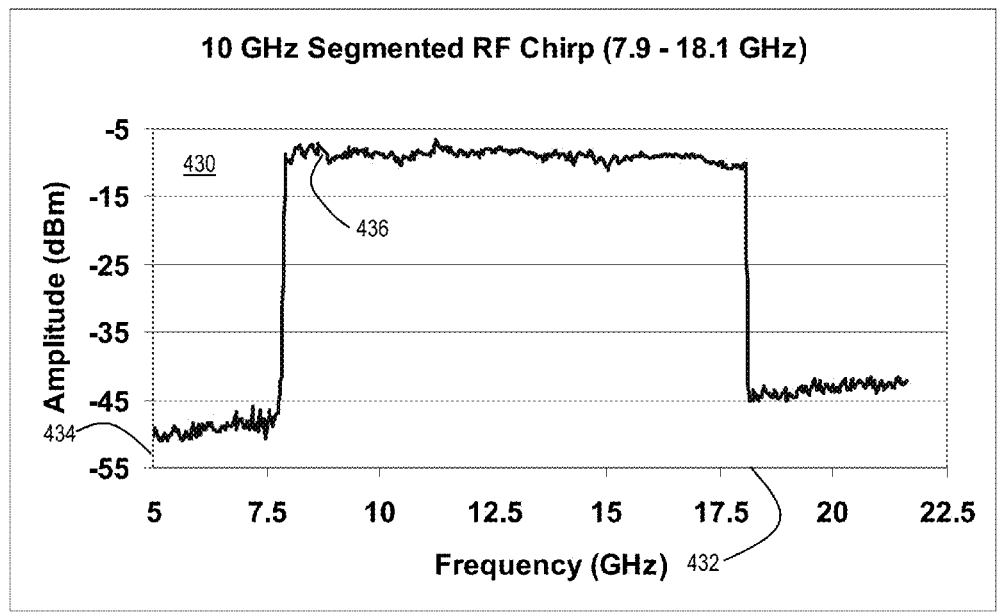
FIG. 4D is a graph that illustrates an example amplitude trace stitched together from three segments of a radio frequency source using shape corrected inputs, according to an embodiment.

An example of a laboratory test result is shown in FIG. 4D. FIG. 4D is a graph 430 that illustrates an example amplitude trace 436 stitched together from three segments of a radio frequency source using shape corrected inputs, according to an embodiment. The horizontal axis 432 is RF frequency in GHz; the vertical axis 424 is amplitude in dBm. After applying a shape correction to the three individual segments, an amplitude variation of ~2 dB over the bandwidth of the full waveform was achieved. A spectrum analyzer trace 436 shows the amplitude profile of a three segment, stitched waveform.

While this technique is very effective at compensating for amplitude variations across the waveform segments, it achieves this at the cost of reduced SNR from the RF waveform source, such as chirp generator 322. The technique has the effect of reducing the vertical resolution of the RF source by the amount of amplitude correction applied to the waveform, which was nearly 15 dB in some embodiments, thus it is desirable to minimize the amount of shaping applied.

By characterizing both amplitude and phase of the RF signal path (e.g. with a wideband network analyzer) the shape correction technique is extended, in some embodiments, to also correct the phase of the waveform to compensate for dispersion in the RF signal path; thus improving both amplitude flatness and waveform linearity.

4. Tunable Optical Filters

Custom, tunable optical filters are available for optical filter 108, which provide excellent attenuation of unwanted optical signals outside the sideband of interest, while maintaining a flat passband response. As used herein, optical filters are understood to include all known types of filtering methods such as, but not limited to, absorptive, reflective, bandpass, notch, etc. and may or may not have the capability to be tuned in frequency or bandwidth or both. In several example embodiments described below, a tunable, Fiber Bragg grating (FBG) module from Teraxion was used to produce the desired results. In various embodiments, tuning of the optical filter occurs before or during introduction of the RF modulation.

Figure 5A:
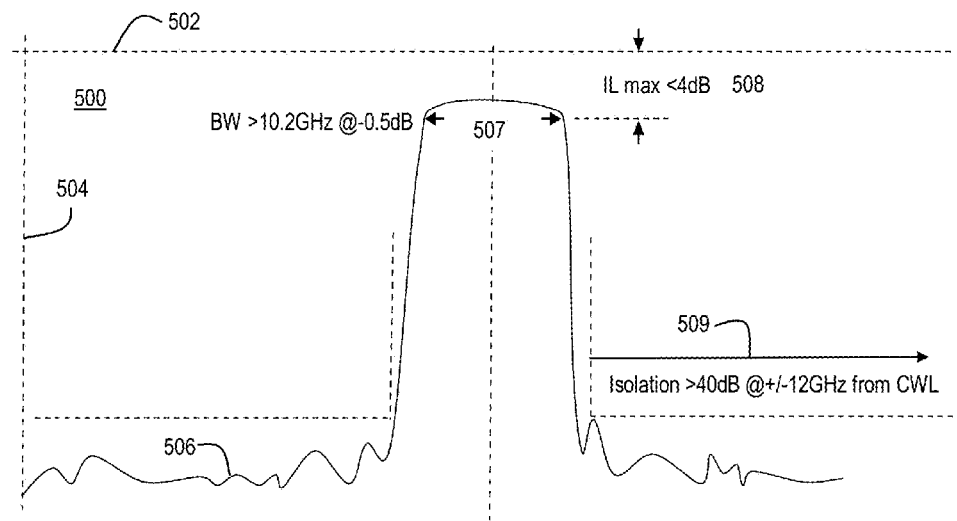
FIG. 5A is a block diagram that illustrates an example response of a tunable optical filter, according to an embodiment.

FIG. 5A is a diagram 500 that illustrates an example response of a tunable optical filter, according to an embodiment. FIG. 5A shows a simulated spectral response 506 of the custom, tunable optical FBG filter, designed to be an optical bandpass, and used in laboratory tests to attenuate the optical carrier and unused orders of sidebands generated by the modulation stage. In the simulation shown, the optical filter has been tuned to have a response bandwidth (BW) 507 of approximately 10.2 GHz. Additional specifications show that this filter has an insertion loss 508 of <4 dB and out of band suppression of >40 dB for frequencies over 12 GHz from a center wavelength (CWL) and corresponding center frequency. An optical filter that can be tuned in frequency and bandwidth is advantageous in allowing different frequency bands to be processed (i.e. switching from a 10-20 GHz input signal to a 15-30 GHz input signal) or for different sidebands to be isolated (i.e. switching from the fundamental harmonic optical frequency sideband (e.g. 10-15 GHz) to a higher order harmonic sideband (e.g. 20-30 GHz). In addition to adjusting the frequency of the custom filter, it is also possible, in some embodiments, to increase or decrease the bandwidth of the filter by adjusting the filter edges. This is useful when it is desired to select a higher order optical sideband.

Figure 5B:
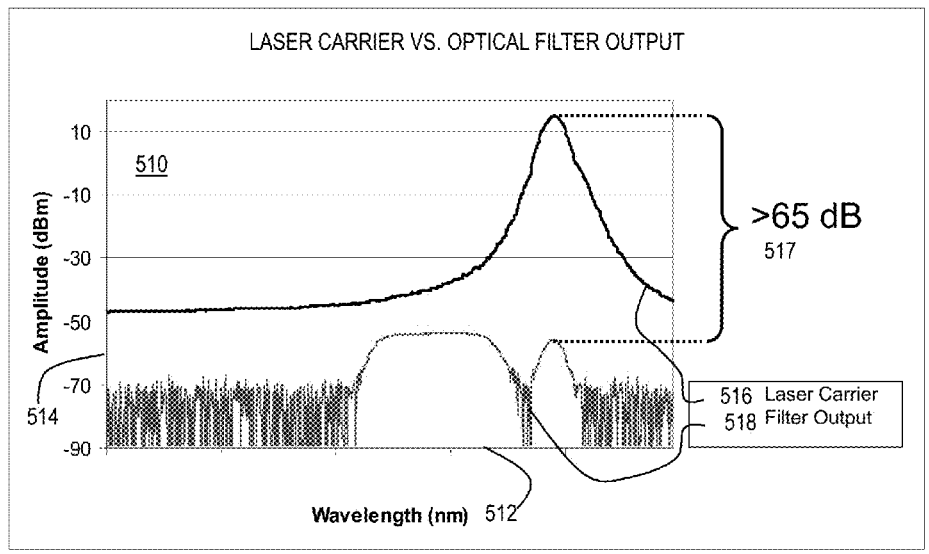
FIG. 5B is a graph that illustrates an example wavelength response of a tunable optical filter to an optical carrier frequency outside a pass band of the optical filter, according to an embodiment.

FIG. 5B is a graph 510 that illustrates an example wavelength response 518 of a tunable optical filter to an optical carrier frequency 516 outside a pass band of the optical filter, according to an embodiment. The horizontal axis is relative wavelength, λ, which is related to optical frequency, f, by f=c/λ, where c is the speed of light. The trace 518 shows the output of tunable optical filter as measured on an optical spectrum analyzer. The filter was tuned down in wavelength, making the optical carrier an out of band signal. The passband of the optical filter is seen in the lower trace near the center of the plot. The custom optical filter was frequency tuned by adjusting the temperature of the device. The optical filter was positioned so as to attenuate the optical carrier, and to pass a wideband modulated waveform. Laboratory measurements shown in trace 518 show that it is possible to achieve >65 dB of optical carrier suppression with the implementation of a custom optical filter.

5. Optical Frequency Doublers

In some embodiments, an optical frequency doubler 114 is included in the optical SSB-SC source 100. In an example embodiment of such embodiments, multiple sub-octave linear frequency modulated RF signals are stitched together in an RF source 106 to drive an optical modulator 104, such as an EOM. The EOM creates multiple USB and LSB signals around a stable laser optical carrier. An optical filter selects one sideband, e.g., the first USB of the modulated optical signal. The segmented optical signal then passes through an optical frequency doubler 114, which doubles the frequency, bandwidth, and chirp rate as compared to the input optical signal. Some embodiments use a nonlinear material to generate an optical wave with twice the optical frequency and half the wavelength of the initial input signal. This phenomenon has been previously demonstrated and is known as second harmonic generation (SHG). Use of a frequency doubler in some embodiments is advantageous in that the bandwidth of the optical signal is doubled, and can be successfully exploited when a laser carrier is available to drive the modulator. Such optical frequency doublers are known, at least in the vicinity of certain optical frequencies, such as optical frequencies near 189 THz (wavelength of 1586 nm). In such embodiments, the desired output frequency is a sideband of $2*f_{CARRIER}$.

Figure 6A:
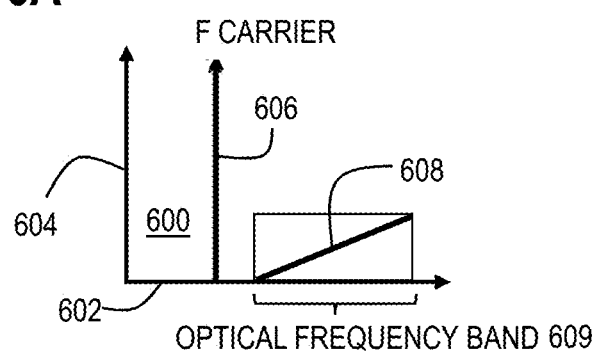
FIG. 6A is a block diagram that illustrates an example modulated optical signal with a carrier frequency and sideband, according to an embodiment.
Figure 6B:
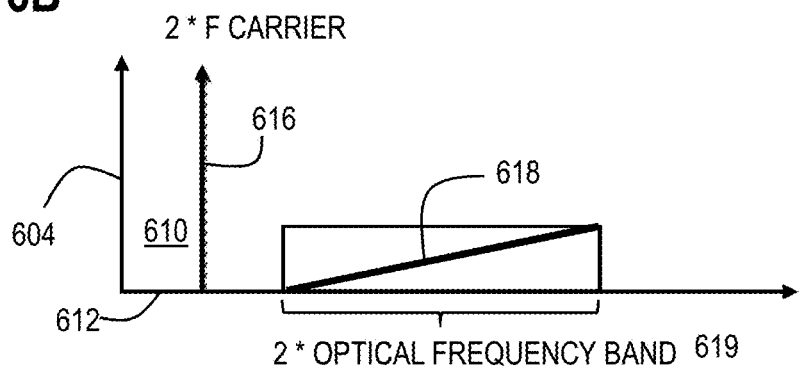
FIG. 6B is a block diagram that illustrates an example modulated optical signal with a carrier frequency and sideband output by a frequency doubler, according to an embodiment.

FIG. 6A is a diagram 600 that illustrates an example modulated optical signal with a carrier frequency 606 and upper sideband 608, according to an embodiment. The horizontal axis 602 is relative optical frequency and the vertical axis 604 is time increasing upward. The sideband 608 traverses the optical frequency band 609. FIG. 6B is a diagram 610 that illustrates an example modulated optical signal with a carrier frequency 616 and sideband 618 output by a frequency doubler, according to an embodiment. The horizontal axis 612 is relative optical frequency and the vertical axis 604 is time increasing upward. The doubled optical carrier 616 is at twice the optical frequency of optical carrier 606 and the doubled sideband 618 traverses an optical frequency band 619 that is twice the frequency band 609.

In an example embodiment, the optical carrier has a wavelength of 1586 nm and a frequency of about 189 THz. A 3.5 GHz bandwidth linear RF frequency modulated waveform is modulated onto an optical carrier via the optical modulator 104. A tunable optical filter 108 selectively filters the third LSB, resulting in a bandwidth (e.g., 10.5 GHz) that is equivalent to three times that (e.g., 3.5 GHz) of the original RF waveform. After passing through an optical frequency doubler 114, the optical carrier's frequency is doubled to about 378 THz with a wavelength of 793 nm, and the third LSB modulated sideband has a bandwidth of 21 GHz.

6. Injection Locking Modules

In some embodiments, an additional optical component is used to reduce the relative intensity noise (RIN) in order to achieve an optical output that is limited only by shot noise. In an example embodiment, a segmented RF signal from RF source 106 drives an optical modulator 104. In optical modulator 104, the segmented RF signal modulates a stable laser 102 generated optical carrier, creating multiple USB and LSB centered on the carrier. An optical filter 108 selectively passes the first USB, which has a chirp rate and bandwidth equivalent to the original RF drive source 106. The modulated optical signal then passes into an optical injection locking module 116 performing RIN suppression. The output optical signal becomes shot noise limited, resulting in an increased signal to noise ratio (SNR) of the optical signal, such as read input signal 118. Thus, in this example embodiment, RIN suppression hardware is included. This embodiment allows the optical source 100 to achieve a shot noise limited response, thus improving the dynamic range of the optical signal 118.

Optical injection locking utilizes two laser sources, referred to as the master and the slave. By injecting the master laser into the slave via an optical circulator or free-space optical hardware, the slave's lasing wavelength locks to that of the master's. The injection mode is then amplified by the gain of the slave while suppressing the amplified spontaneous emission (ASE) from the slave modes. The injection locking stage improves the dynamic range of the system and lowers the relative intensity noise (RIN).

FIG. 7A is a block diagram that illustrates example components an injection locking module 700 for suppressing relative intensity noise (RIN), according to an embodiment. In the illustrated embodiment the injection locking module includes a modulated master laser 702, minor 704, half wavelength phase changers 706 and 710, polarization beam splitter (PBS) 708, optical isolator 712, Faraday rotator 714, and slave laser 716. A wideband, low power laser signal (from modulated master laser 702, such as components 102, 104, 106 and 108), is injected onto a high power laser (slave laser 716) via the various optical components. By adjusting the temperature and pump current of the slave 716 it is possible to lock the slave's frequency to that of the master. This method results in reduced amplified spontaneous emission (ASE) and relative intensity noise (RIN) of the optical system.

FIG. 7B is a diagram 720 that illustrates an example spectrum of an instantaneous injected master optical signal 728 relative to a cavity mode resonant frequency 726 of a slave laser, according to an embodiment. The horizontal axis is relative optical frequency 722 and the vertical axis is amplitude in arbitrary units. The slave laser naturally emits at a particular frequency 726 of multiple optical frequencies associated with corresponding cavity modes. When a different frequency 728 is injected, the slave laser moves toward the injected frequency. FIG. 7C is a diagram 730 that illustrates an example spectrum of an instantaneous output optical signal 738 relative to the cavity mode resonant frequency 736 of the slave laser, according to an embodiment. Power is transferred to the frequency 738 at the expense of the cavity mode frequency 736. This behavior is produced for a single frequency input. Injecting a complex signal with several simultaneous optical frequencies does not provide such a response. Because the chirps contemplated in various embodiments are single frequency at any one instant, the benefits of injection locking are enjoyed in sequence by each successive frequency in the chirp.

Figure 7D:
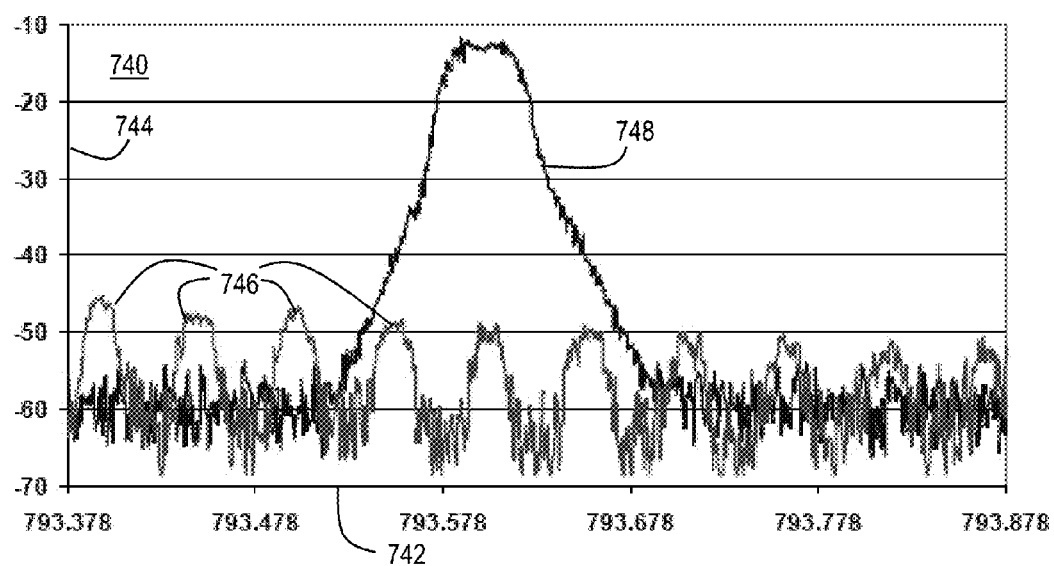
FIG. 7D is a graph that illustrates an example wavelength spectrum of an output optical signal relative to the spectrum of free-running facet mode resonant frequencies of the slave laser, according to an embodiment.

FIG. 7D is a graph that illustrates an example wavelength spectrum of an output optical signal 748 relative to the spectrum of free-running facet mode resonant frequencies 746 of the slave laser, according to an embodiment. The horizontal axis 742 is wavelength in nm; and the vertical axis is amplitude in dBm.

It is advantageous to have the injection locking stage as the last component in the optical chain of source 100 in some embodiments to overcome the RIN and distortion from all the upstream optical components. In some embodiments including a frequency doubler 114, the frequency-doubled wideband optical signal is used to seed input to the optical injection locking module 116. In other embodiments, there is no frequency doubler 114; and the injection locking module 116 is included after the optical filter 108. In such embodiments, the output signal 118 is the output from injection locking module 116. In some embodiments, the frequency doubler 114 is used, but the injection locking module 116 is disposed prior to the frequency doubler 114. A disadvantage of this embodiment is that any RIN or distortion that arises from the frequency doubler 114 is not overcome by the injection locking module 116.

7. Example Embodiments

In an example embodiment, the SSB-SC source 100 includes a Koheras Boostik E-15 100 mW laser near 1586.8 nm as stable laser 102. The RF drive source 106 came from a Tektronix AWG7102 arbitrary waveform generator. In some embodiments, a 10 GHz segmented chirp was generated by RF source 106 based on the RF AWG output, as described above. In some cases, this segmenting was bypassed. These two signals (optical and RF) drove an electro-optical modulator from EOSpace that was single mode for 1586 nm light as optical modulator 104 with a >20 GHz bandwidth. The output from the modulator 108 was fiber optically coupled into the fiber Bragg gratings from Teraxion as tunable optical filter 108, as previously described. The filter output was controlled with respect to polarization with polarization controllers 110 from Thor Labs that were fiber optically coupled. The output of the polarization controller was input to an erbium doped fiber amplifier (EDFA) from IPG Photonics as optical amplifier 112, with an output signal level of about 200 mW. This light was input to a periodically poled lithium nioboate (PPLN) from vendor HC Photonics as frequency doubler 114, with an output of about 5 mW at 793 nm. This light was input to an optical injection locking platform 116, with an optical power out of about 65 mW with settings on the current driver of about 45 milliAmperes (mA, 1 mA=$10^{-3}$ Amperes) and temperature about 21 degrees Celsius. This light is amplified, in some embodiments, with another optical amplifier (not shown). In various embodiments, an amplifier downstream of the injection locking module 116 is included for wavelengths at 793 nm, comprising one or more of Boosta TA-100 from Toptica, or a New Focus TA7614, with gain typical of these devices, outputting a signal 118 with up to 250 mW, which is fiber optically coupled at 793 nm.

Typical experimental results for filtering the first order of the modulator and using a 10 GHz RF drive source are shown in FIG. 7D, described above. Tests have shown that the injection locking system is capable of locking over 20 GHz of bandwidth while maintaining ~42 dB of SNR. This kind of performance is achieved after adjusting the current and temperature of the slave diode. The injection locking output 748 is stable over 20 GHz and, in other embodiments, is expected to be extended to >20 GHz by maintaining the proper ratio of the input seed power to the slave laser power and with proper current and temperature tuning.

Figure 8A:
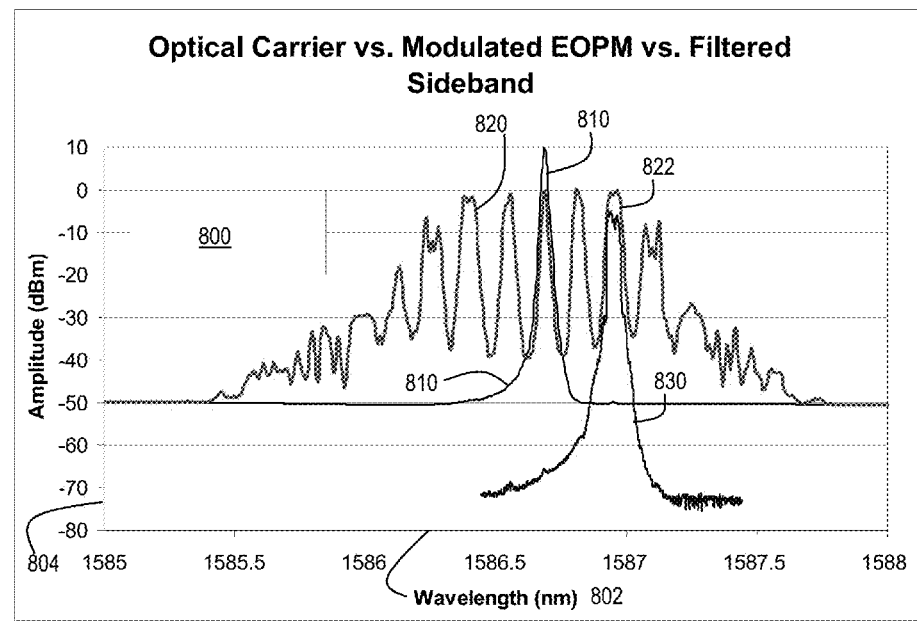
FIG. 8A is a graph that illustrates example wavelength spectra of optical signals output by a stable laser, an optical modulator and an optical filter that passes a second lower sideband, according to an embodiment.

FIG. 8A is a graph 800 that illustrates example wavelength spectra of optical signals 810, 820 and 830 output by a stable laser, an optical modulator and an optical filter that passes a second lower sideband, respectively, according to an embodiment. The horizontal axis 802 is wavelength in nm; the vertical axis 804 is amplitude in dBm.

The traces 810, 820 and 830 are optical spectrum analyzer traces at each step, with a resolution of 0.01 nm. This resolution limit can make the comparison of the sideband bandwidths difficult to visualize, but the wider bandwidth is seen for the relationship of higher orders. The laser trace 810 is modulated by the driving RF source 106 and creates a modulated optical trace 820 with many sidebands, including a second LSB 822 (at longer wavelength near 1587). The drive RF in this case was 3.5 GHz, with RF conditioning which upconverted this signal onto 14.6-18.1 GHz with respect to the optical carrier 810. The modulated output was filtered on the $2^{nd}$ LSB (where the LSB terminology refers to frequency, and in this graph the x-axis is wavelength, so where higher wavelength is lower frequency), and the $2^{nd}$ sideband has a bandwidth of 7 GHz. The laser is tuned in this case so that $2^{nd}$ LSB is tuned into the filter bandwidth and passes, while everything else is selectively filtered out.

Figure 8B:
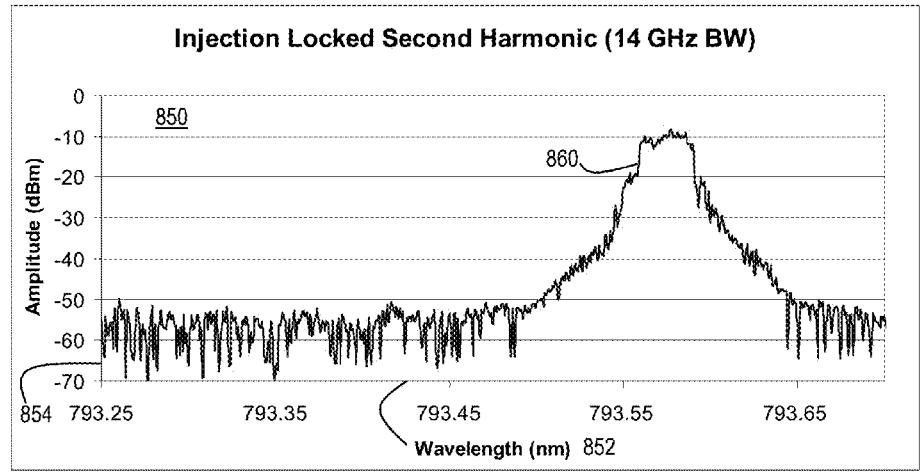
FIG. 8B is a graph that illustrates an example wavelength spectrum of the optical signal output by a frequency doubler acting on output from the optical filter of FIG. 8A, according to an embodiment.

FIG. 8B is a graph 850 that illustrates an example wavelength spectrum 860 of the optical signal output by a frequency doubler acting on output from the optical filter of FIG. 8A after RIN suppression, according to an embodiment. The horizontal axis 852 is wavelength in nm (at half the values of axis 802); and, the vertical axis 854 is amplitude in dBm. In this embodiment the example polarization controller 110 and optical amplifier 112 are included between the optical filter 108 and frequency doubler 114, and the injection locking module 116 is included after the frequency doubler 114 for RIN suppression. The frequency doubler stage effectively doubles the bandwidth to 14 GHz, and the injection locking flattens out the readout signal intensity as evident in trace 860.

Figure 9A:
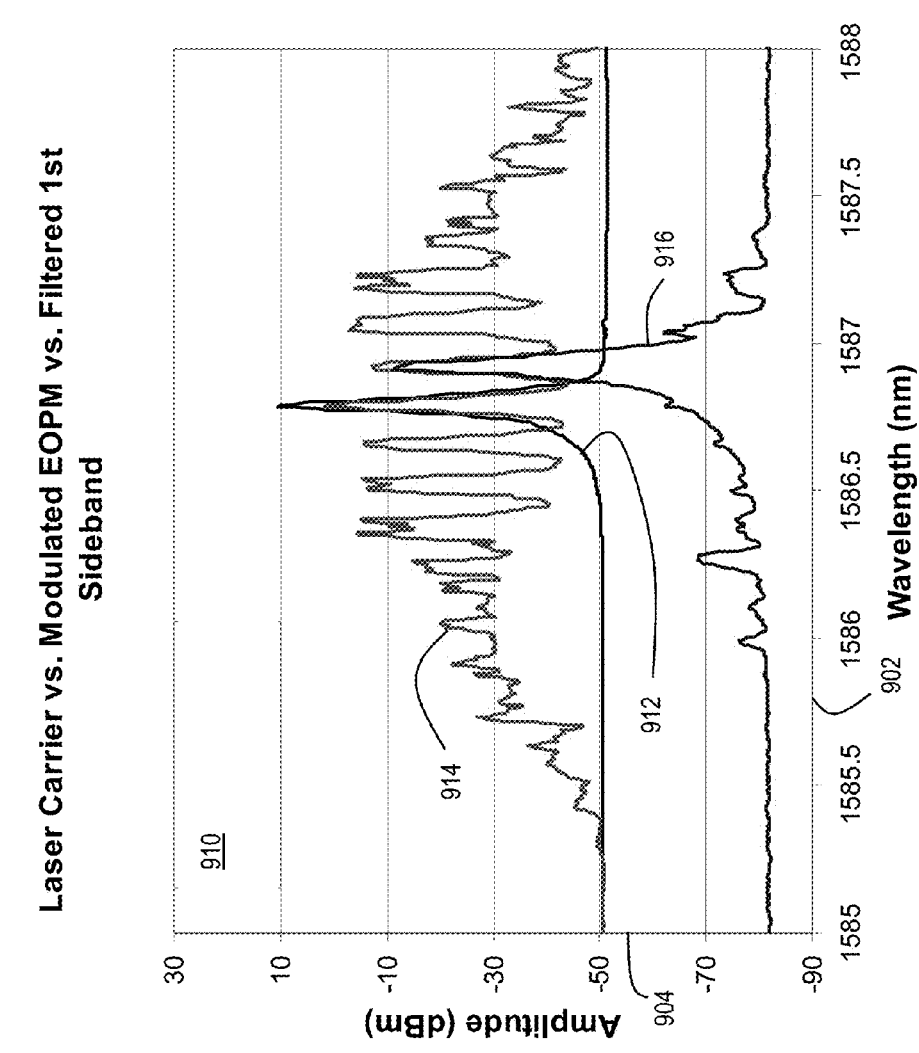
FIGS. 9A, 9B and 9C are graphs that illustrate example wavelength spectra of optical signals output by a stable laser, an optical modulator and an optical filter wherein the stable laser is tuned so that the optical filter passes the first sideband, second sideband and third sideband, respectively, according to another embodiment.
Figure 9B:
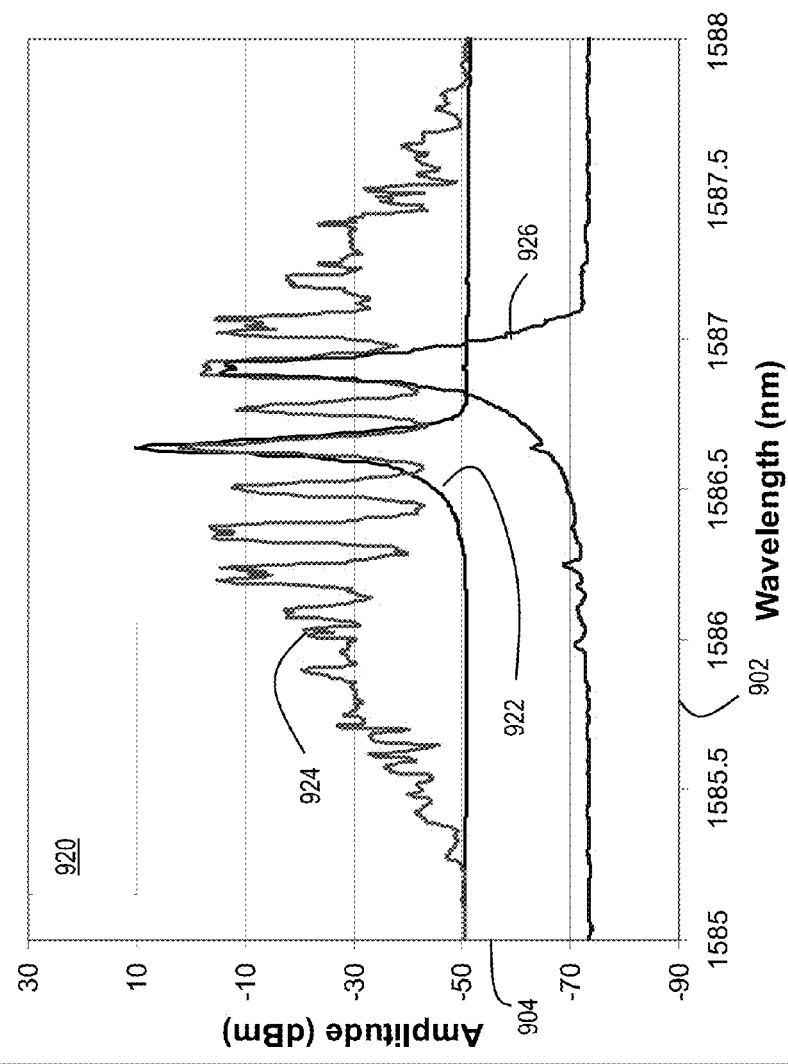
Figure 9C:
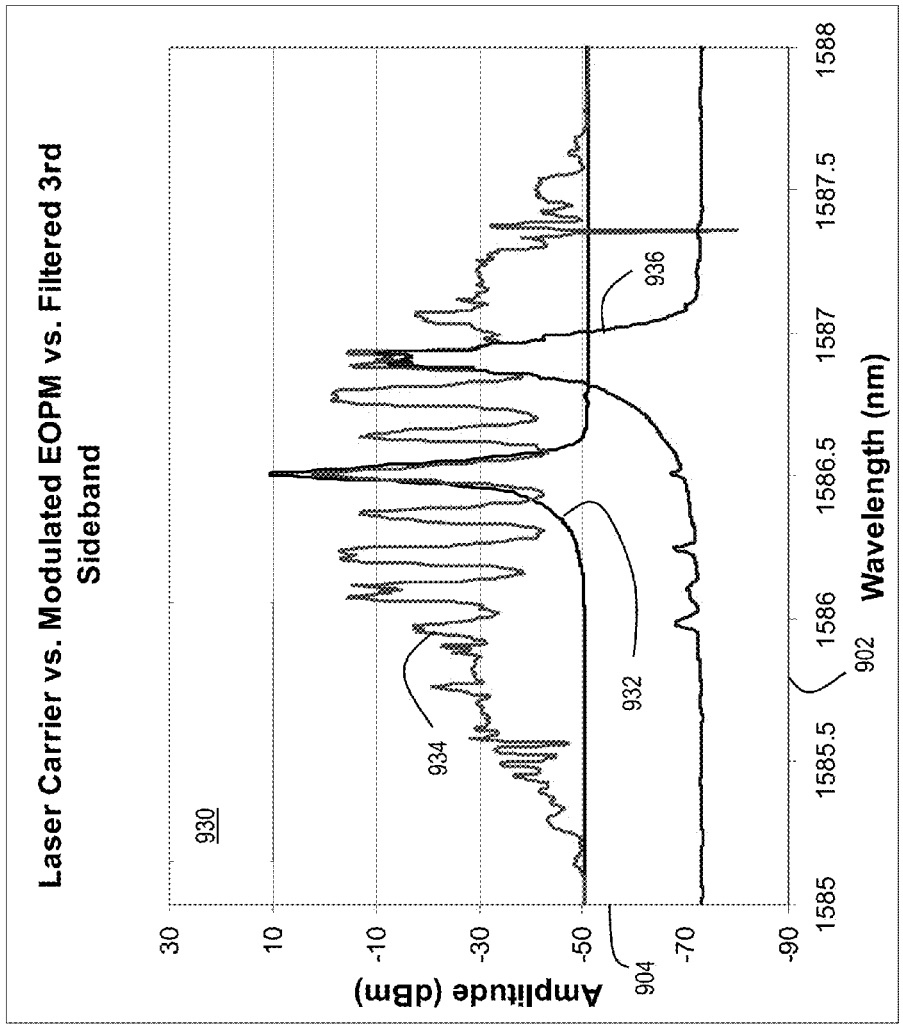

FIGS. 9A, 9B and 9C are graphs 910, 920, 930 that illustrate example wavelength spectra of optical signals output by a stable laser, an optical modulator and an optical filter wherein the stable laser is tuned so that the optical filter passes the first sideband, second sideband and third sideband, respectively, according to another embodiment.

Graphs 910, 920 and 930 share the same horizontal axis 902 of optical wavelength in nanometers, and the same vertical axis of amplitude in dBm. The carrier frequency output by the stable laser is plotted as traces 912, 922 and 932 in graphs 910, 920 and 930, respectively, moving down in wavelength successively in each graph from about 1586.8 nm to about 1586.65 nm to about 1586.5 nm. The output from the optical modulator is plotted as traces 914, 924 and 934 in graphs 910, 920 and 930, respectively, also moving down in wavelength. The output from the optical filter is plotted as traces 916, 926 and 936 in graphs 910, 920 and 930, respectively and passes optical signals in the same band centered near 1586.9 for all three graphs. The passed band includes the first sideband, the second sideband and the third sideband, respectively, in graphs 910, 920 and 930. Thus the single sideband can be selected by tuning the laser, in addition to or instead of tuning the optical filter.

Thus in a first set of embodiments, sub-octave, single sideband RF signals are modulated onto a stable laser optical carrier by means of an electro-optic modulator (EOM). The EOM creates a multiple sideband optical signal and a tunable optical sideband filter selectively filters out the carrier and unwanted sidebands, passing only the modulated sideband of interest. By frequency tuning the optical filter, one can select any single order of modulated optical sideband (in either the upper sideband or lower sideband) including the optical carrier as the target. There are also types of EOMs (e.g. Mach-Zehnder EOMs) well known in the art that only produce a sub-set of the harmonics sidebands (not all orders). In some embodiments, these EOMS, when used in conjunction with the optical filter, help isolate a single order optical frequency sideband. This would allow for higher bandwidth input signals to be used to isolated higher order optical frequency sidebands.

In some embodiments, the single sideband generated RF waveforms are described as being wideband waveforms with frequency modulation where the modulation frequency is a linear function of time.

In some embodiments, multiple linear frequency modulated waveforms which are termed "segments" become temporally overlapped in frequency by means of RF hardware including, but not limited to switches, filters, mixers, and amplifiers. A method of overlapping multiple segments, termed "stitching," is useful in greatly increasing the bandwidth of an optical system. No limitation is presented on the number of segments that can be overlapped in various embodiments.

In some embodiments, the linear frequency modulated waveform segments vary in bandwidth and duration.

In some embodiments, one adjusts the duration and bandwidth of the linear frequency modulated waveform as determined by the user and/or hardware specifications.

In some embodiments, the amplitude and phase of each segmented waveform is shaped in the RF drive source to compensate for dispersion in the RF signal path thus improving both amplitude flatness and chirp linearity.

In some embodiments, the linear frequency modulated signal is modulated either upward or downward in frequency.

In various embodiments, the RF drive source signal is transmitted or received, or both, via an RF antenna.

In various embodiments, the optical filter is either fixed or tunable, depending on the design targets.

In some embodiments, the optical signal to be filtered is any of the sidebands generated from optical modulation, and advantages to using a Nth order sideband is a N-fold bandwidth enhancement using that sideband compared to the $1^{st}$ order sideband.

In some embodiments, the filtered optical signal is amplified by an appropriate optical amplifier and frequency doubled to increase the bandwidth of the optical system.

In some embodiments, relative intensity noise suppression is performed to improve the signal-to-noise (SNR) of the optical signal by means of an optical injection locking system.

In some embodiments, the filtered optical signal assists in recovering optical spectral features in a target optical spectrum and allows the determination of spectral content of a target optical spectrum during one or more optical interactions.

In some embodiments, the modulated optical signal is passed through an optical material to perform functions including, but not limited to optical absorption, transmission, reflection, diffraction, dispersion, and scattering. In some embodiments, optical signal is one of a plurality of input signals used to perform optical signal processing in the optical material.

In various embodiments, these techniques enable a fast measurement of spectral features over a broad spectral range with high resolution and eliminate the need for prior knowledge of the spectral feature to adjust the chirp rate, as required by conventional absorption spectroscopy.

8. Control Hardware Overview

Figure 11:
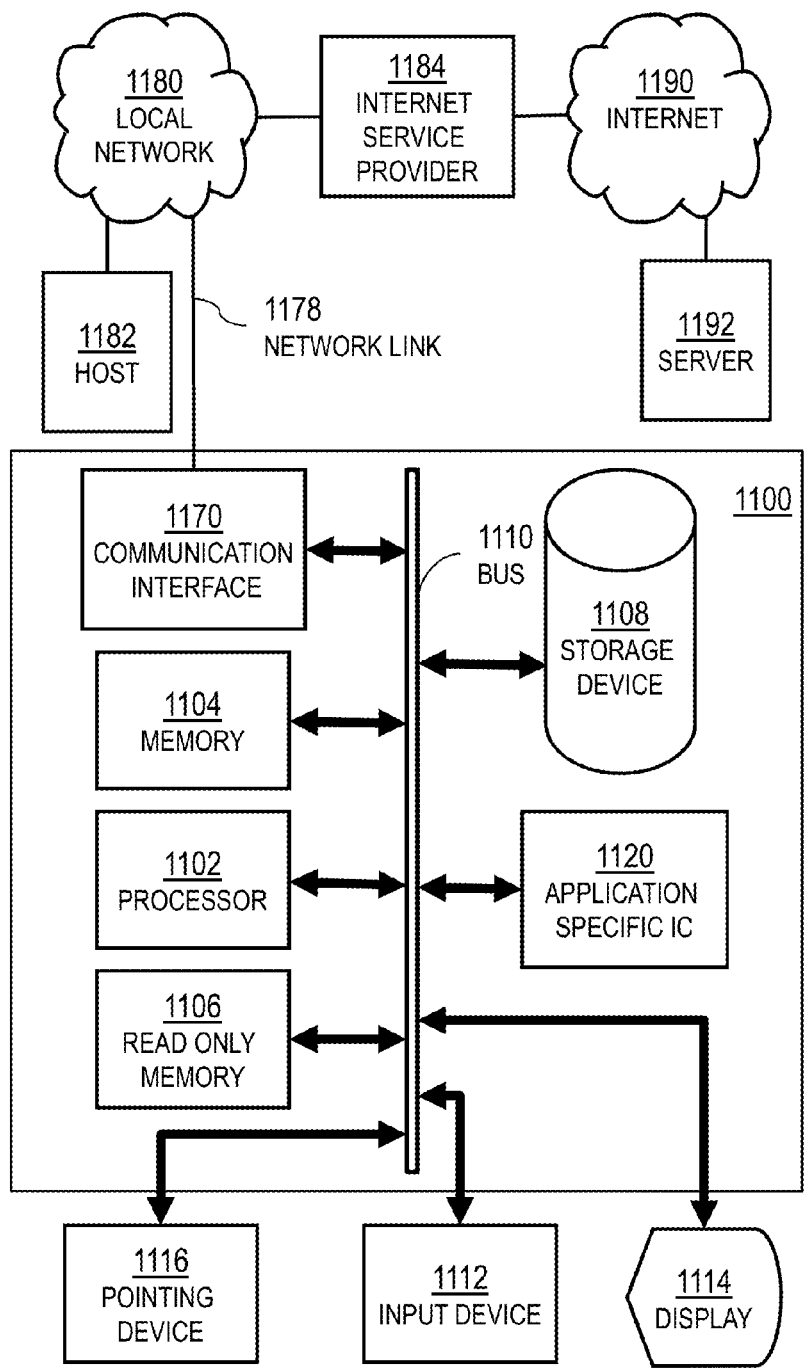
FIG. 11 is a block diagram that illustrates a computer system upon which an embodiment of the invention may be implemented.

FIG. 11 is a block diagram that illustrates a computer system 1100 upon which an embodiment of the invention to control one or more optical elements may be implemented. Computer system 1100 includes a communication mechanism such as a bus 1110 for passing information between other internal and external components of the computer system 1100. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1100, or a portion thereof, constitutes a means for performing one or more steps of one or more methods described herein.

A sequence of binary digits constitutes digital data that is used to represent a number or code for a character. A bus 1110 includes many parallel conductors of information so that information is transferred quickly among devices coupled to the bus 1110. One or more processors 1102 for processing information are coupled with the bus 1110. A processor 1102 performs a set of operations on information. The set of operations include bringing information in from the bus 1110 and placing information on the bus 1110. The set of operations also typically include comparing two or more units of information, shifting positions of units of information, and combining two or more units of information, such as by addition or multiplication. A sequence of operations to be executed by the processor 1102 constitute computer instructions.

Computer system 1100 also includes a memory 1104 coupled to bus 1110. The memory 1104, such as a random access memory (RAM) or other dynamic storage device, stores information including computer instructions. Dynamic memory allows information stored therein to be changed by the computer system 1100. RAM allows a unit of information stored at a location called a memory address to be stored and retrieved independently of information at neighboring addresses. The memory 1104 is also used by the processor 1102 to store temporary values during execution of computer instructions. The computer system 1100 also includes a read only memory (ROM) 1106 or other static storage device coupled to the bus 1110 for storing static information, including instructions, that is not changed by the computer system 1100. Also coupled to bus 1110 is a non-volatile (persistent) storage device 1108, such as a magnetic disk or optical disk, for storing information, including instructions, that persists even when the computer system 1100 is turned off or otherwise loses power.

Information, including instructions, is provided to the bus 1110 for use by the processor from an external input device 1112, such as a keyboard containing alphanumeric keys operated by a human user, or a sensor. A sensor detects conditions in its vicinity and transforms those detections into signals compatible with the signals used to represent information in computer system 1100. Other external devices coupled to bus 1110, used primarily for interacting with humans, include a display device 1114, such as a cathode ray tube (CRT) or a liquid crystal display (LCD), for presenting images, and a pointing device 1116, such as a mouse or a trackball or cursor direction keys, for controlling a position of a small cursor image presented on the display 1114 and issuing commands associated with graphical elements presented on the display 1114.

In the illustrated embodiment, special purpose hardware, such as an application specific integrated circuit (IC) 1120, is coupled to bus 1110. The special purpose hardware is configured to perform operations not performed by processor 1102 quickly enough for special purposes. Examples of application specific ICs include graphics accelerator cards for generating images for display 1114, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1100 also includes one or more instances of a communications interface 1170 coupled to bus 1110. Communication interface 1170 provides a two-way communication coupling to a variety of external devices that operate with their own processors, such as printers, scanners and external disks. In general the coupling is with a network link 1178 that is connected to a local network 1180 to which a variety of external devices with their own processors are connected. For example, communication interface 1170 may be a parallel port or a serial port or a universal serial bus (USB) port on a personal computer. In some embodiments, communications interface 1170 is an integrated services digital network (ISDN) card or a digital subscriber line (DSL) card or a telephone modem that provides an information communication connection to a corresponding type of telephone line. In some embodiments, a communication interface 1170 is a cable modem that converts signals on bus 1110 into signals for a communication connection over a coaxial cable or into optical signals for a communication connection over a fiber optic cable. As another example, communications interface 1170 may be a local area network (LAN) card to provide a data communication connection to a compatible LAN, such as Ethernet. Wireless links may also be implemented. Carrier waves, such as acoustic waves and electromagnetic waves, including radio, optical and infrared waves travel through space without wires or cables. Signals include man-made variations in amplitude, frequency, phase, polarization or other physical properties of carrier waves. For wireless links, the communications interface 1170 sends and receives electrical, acoustic or electromagnetic signals, including infrared and optical signals, that carry information streams, such as digital data.

The term computer-readable medium is used herein to refer to any medium that participates in providing information to processor 1102, including instructions for execution. Such a medium may take many forms, including, but not limited to, non-volatile media, volatile media and transmission media. Non-volatile media include, for example, optical or magnetic disks, such as storage device 1108. Volatile media include, for example, dynamic memory 1104. Transmission media include, for example, coaxial cables, copper wire, fiber optic cables, and waves that travel through space without wires or cables, such as acoustic waves and electromagnetic waves, including radio, optical and infrared waves. The term computer-readable storage medium is used herein to refer to any medium that participates in providing information to processor 1102, except for transmission media.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read.

Logic encoded in one or more tangible media includes one or both of processor instructions on a computer-readable storage media and special purpose hardware, such as ASIC *1120.

Network link 1178 typically provides information communication through one or more networks to other devices that use or process the information. For example, network link 1178 may provide a connection through local network 1180 to a host computer 1182 or to equipment 1184 operated by an Internet Service Provider (ISP). ISP equipment 1184 in turn provides data communication services through the public, world-wide packet-switching communication network of networks now commonly referred to as the Internet 1190. A computer called a server 1192 connected to the Internet provides a service in response to information received over the Internet. For example, server 1192 provides information representing video data for presentation at display 1114.

The invention is related to the use of computer system 1100 for implementing the techniques described herein. According to one embodiment of the invention, those techniques are performed by computer system 1100 in response to processor 1102 executing one or more sequences of one or more instructions contained in memory 1104. Such instructions, also called software and program code, may be read into memory 1104 from another computer-readable medium such as storage device 1108. Execution of the sequences of instructions contained in memory 1104 causes processor 1102 to perform the method steps described herein. In alternative embodiments, hardware, such as application specific integrated circuit 1120, may be used in place of or in combination with software to implement the invention. Thus, embodiments of the invention are not limited to any specific combination of hardware and software.

The signals transmitted over network link 1178 and other networks through communications interface 1170, carry information to and from computer system 1100. Computer system 1100 can send and receive information, including program code, through the networks 1180, 1190 among others, through network link 1178 and communications interface 1170. In an example using the Internet 1190, a server 1192 transmits program code for a particular application, requested by a message sent from computer 1100, through Internet 1190, ISP equipment 1184, local network 1180 and communications interface 1170. The received code may be executed by processor 1102 as it is received, or may be stored in storage device 1108 or other non-volatile storage for later execution, or both. In this manner, computer system 1100 may obtain application program code in the form of a signal on a carrier wave.

Various forms of computer readable media may be involved in carrying one or more sequence of instructions or data or both to processor 1102 for execution. For example, instructions and data may initially be carried on a magnetic disk of a remote computer such as host 1182. The remote computer loads the instructions and data into its dynamic memory and sends the instructions and data over a telephone line using a modem. A modem local to the computer system 1100 receives the instructions and data on a telephone line and uses an infra-red transmitter to convert the instructions and data to a signal on an infra-red a carrier wave serving as the network link 1178. An infrared detector serving as communications interface 1170 receives the instructions and data carried in the infrared signal and places information representing the instructions and data onto bus 1110. Bus 1110 carries the information to memory 1104 from which processor 1102 retrieves and executes the instructions using some of the data sent with the instructions. The instructions and data received in memory 1104 may optionally be stored on storage device 1108, either before or after execution by the processor 1102.

Figure 12:
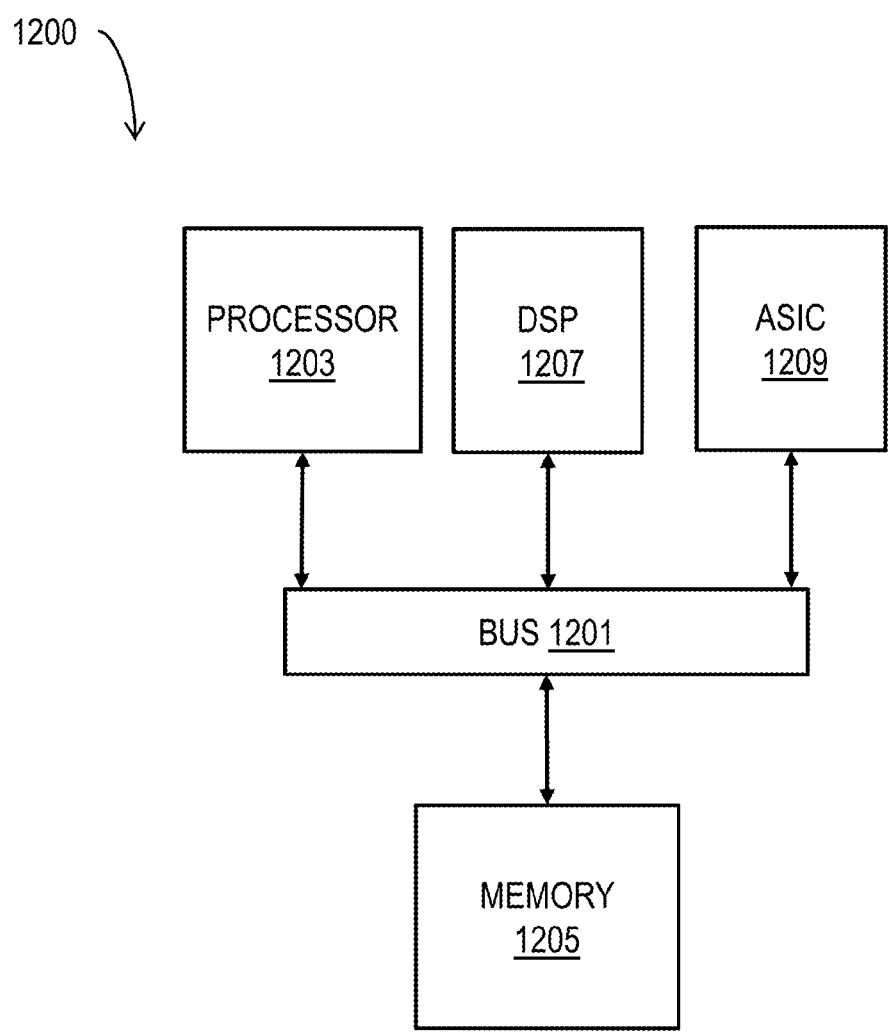
FIG. 12 illustrates a chip set upon which an embodiment of the invention may be implemented.

FIG. 12 illustrates a chip set 1200 upon which an embodiment of the invention may be implemented. Chip set 1200 is programmed to perform one or more steps of a method described herein and includes, for instance, the processor and memory components described with respect to FIG. 11 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1200, or a portion thereof, constitutes a means for performing one or more steps of a method described herein.

In one embodiment, the chip set 1200 includes a communication mechanism such as a bus 1201 for passing information among the components of the chip set 1200. A processor 1203 has connectivity to the bus 1201 to execute instructions and process information stored in, for example, a memory 1205. The processor 1203 may include one or more processing cores with each core configured to perform independently. A multi-core processor enables multiprocessing within a single physical package. Examples of a multi-core processor include two, four, eight, or greater numbers of processing cores. Alternatively or in addition, the processor 1203 may include one or more microprocessors configured in tandem via the bus 1201 to enable independent execution of instructions, pipelining, and multithreading. The processor 1203 may also be accompanied with one or more specialized components to perform certain processing functions and tasks such as one or more digital signal processors (DSP) 1207, or one or more application-specific integrated circuits (ASIC) 1209. A DSP 1207 typically is configured to process real-world signals (e.g., sound) in real time independently of the processor 1203. Similarly, an ASIC 1209 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1203 and accompanying components have connectivity to the memory 1205 via the bus 1201. The memory 1205 includes both dynamic memory (e.g., RAM, magnetic disk, writable optical disk, etc.) and static memory (e.g., ROM, CD-ROM, etc.) for storing executable instructions that when executed perform one or more steps of a method described herein. The memory 1205 also stores the data associated with or generated by the execution of one or more steps of the methods described herein.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. An apparatus comprising:
   a stable laser source configured to output an optical carrier signal at a carrier frequency;
   a radio frequency electrical source configured to output a single sideband electrical radio frequency signal with a radio frequency bandwidth less than one octave;
   an optical modulator configured to output an optical signal with the optical carrier signal modulated by the radio frequency signal in a plurality of harmonics of optical frequency sidebands; an optical filter configured to pass one single harmonic optical frequency sideband of the optical signal that spans a frequency bandwidth greater than 3.5 GHz without substantial overlap with other harmonic optical frequency sidebands; and
   an optical coupler configured to direct the one single harmonic optical frequency sideband to a target external to the apparatus, wherein, in response, the target modifies the optical signal;
   wherein a frequency of the electrical radio frequency signal changes with time over the radio frequency bandwidth.

2. An apparatus as recited in claim 1, wherein the radio frequency electrical source further comprises a plurality of electrical paths, each path outputting a portion of the electrical radio frequency signal in a different radio frequency band of the radio frequency bandwidth.

3. An apparatus as recited in claim 2, wherein an electrical path of the plurality of electrical paths comprises a dispersion compensating component to compensate for dispersion that would otherwise occur in the electrical path.

4. An apparatus as recited in claim 1, wherein the radio frequency electrical source further comprises an antenna to receive a transmitted portion of the electrical radio frequency signal.

5. An apparatus as recited in claim 1, further comprising an optical amplifier configured to amplify an optical signal over a band based on the frequencies of the single harmonic optical frequency sideband passed by the optical filter.

6. An apparatus as recited in claim 1, further comprising an optical component configured to double the optical frequency of an optical signal based on the single harmonic optical frequency sideband passed by the optical filter.

7. An apparatus as recited in claim 1, further comprising an optical injection locking system configured to suppress relative intensity noise in an optical signal based on the single harmonic optical frequency sideband passed by the optical filter.

8. An apparatus as recited in claim 1, wherein the target is configured to be probed or modified by the single harmonic optical frequency sideband.

9. An apparatus as recited in claim 1, wherein the target comprises an inhomogenously broadened transition (IBT) material.

10. An apparatus as recited in claim 1, wherein the single harmonic optical frequency sideband is not an upper or lower harmonic sideband closest to the carrier frequency.

11. An apparatus as recited in claim 1, wherein the one single harmonic optical frequency sideband of the optical signal that spans a frequency bandwidth greater than 3.5 GHz without substantial overlap with other harmonic optical frequency sidebands is greater than 5 GHz away from the optical carrier.

12. An apparatus as recited in claim 11, wherein the one single harmonic optical frequency sideband of the optical signal is greater than 7.5 GHz away from the optical carrier.

13. An apparatus as recited in claim 1, wherein the radio frequency electrical source is an arbitrary waveform generator.

14. A method comprising: providing a single sideband radio frequency signal with a radio frequency bandwidth less than an octave, wherein the radio frequency signal includes a modulation frequency over the radio frequency bandwidth and wherein the modulation frequency changes with time;
modulating an optical signal with an optical carrier signal by the radio frequency signal to produce a modulated optical signal with a carrier frequency and a plurality of harmonics of optical frequency sidebands based on the radio frequency signal, wherein a frequency bandwidth of a particular single harmonic optical frequency sideband does not substantially overlap with the frequency bandwidths of different harmonic optical frequency sidebands;
filtering the modulated optical signal to pass the particular single harmonic optical frequency sideband that spans a frequency bandwidth greater than 3.5 GHz; and
directing an optical signal based on the particular single harmonic optical frequency sideband to a target external to the apparatus, wherein, in response, the target modifies the optical signal.

15. A method as recited in claim 14, wherein the one single harmonic optical frequency sideband of the optical signal that spans a frequency bandwidth greater than 3.5 GHz without substantial overlap with other harmonic optical frequency sidebands is greater than 5 GHz away from the optical carrier.

16. A method as recited in claim 15, wherein the one single harmonic optical frequency sideband of the optical signal is greater than 7.5 GHz away from the optical carrier.

17. An apparatus comprising:
means for modulating an optical signal with an optical carrier signal by a single sideband radio frequency signal to produce a modulated optical signal with a carrier frequency and a plurality of harmonics of optical frequency sidebands based on the radio frequency signal, wherein the radio frequency signal has a radio frequency bandwidth less than one octave and wherein the radio frequency signal includes a modulation frequency over the radio frequency bandwidth and wherein the modulation frequency is a function of changes with time;
means for filtering the modulated optical signal to pass a single harmonic optical frequency sideband that spans a frequency bandwidth greater than 3.5 GHz without substantial overlap with other harmonic optical frequency sidebands;
and means for directing from the apparatus an optical signal based on the passed single harmonic optical frequency sideband to to a target external to the apparatus, wherein, in response, the target modifies the optical signal.

18. An apparatus as recited in claim 17, wherein the one single harmonic optical frequency sideband of the optical signal that spans a frequency bandwidth greater than 5 GHz without substantial overlap with other harmonic optical frequency sidebands is greater than 5 GHz away from the optical carrier.

19. An apparatus as recited in claim 18, wherein the one single harmonic optical frequency sideband of the optical signal is greater than 7.5 GHz away from the optical carrier.

* * * * *